United States Patent
Lee et al.

(10) Patent No.: US 11,656,837 B2
(45) Date of Patent: May 23, 2023

(54) ELECTRONIC DEVICE FOR CONTROLLING SOUND AND OPERATION METHOD THEREFOR

(71) Applicant: Samsung Electronics Co., Ltd., Suwon-si (KR)

(72) Inventors: Hyunjoong Lee, Suwon-si (KR); Junggap Kuk, Suwon-si (KR); Jinwon Kim, Suwon-si (KR); Jeongeun Lee, Suwon-si (KR); Junho Koh, Suwon-si (KR); Kyunghun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 16/957,988

(22) PCT Filed: Jan. 24, 2019

(86) PCT No.: PCT/KR2019/001005
§ 371 (c)(1),
(2) Date: Jun. 25, 2020

(87) PCT Pub. No.: WO2019/147034
PCT Pub. Date: Aug. 1, 2019

(65) Prior Publication Data
US 2020/0364026 A1     Nov. 19, 2020

(30) Foreign Application Priority Data
Jan. 24, 2018   (KR) .................. 10-2018-0008965

(51) Int. Cl.
*H04R 27/00*      (2006.01)
*G06F 3/16*      (2006.01)
(Continued)

(52) U.S. Cl.
CPC .............. *G06F 3/165* (2013.01); *G10L 25/51* (2013.01); *G10L 25/78* (2013.01); *H04S 7/302* (2013.01)

(58) Field of Classification Search
CPC ............ H04R 2227/005; H04R 25/558; H04R 2430/01; G10L 2015/223; H04N 21/4222;
(Continued)

(56) References Cited

U.S. PATENT DOCUMENTS 9,251,805 B2 * 2/2016 Aratsu ................ G10L 21/0208
9,639,084 B2    5/2017 Nakamura et al.
(Continued)

FOREIGN PATENT DOCUMENTS

JP    2014-137226 A    7/2014
JP    2017-138476 A    8/2017
(Continued)

*Primary Examiner* — George C Monikang
(74) *Attorney, Agent, or Firm* — Jefferson IP Law, LLP

(57) ABSTRACT

According to various embodiments, an electronic device comprises, a memory for storing instructions, and a processor for executing the stored instructions, wherein the processor is further configured, as the instructions are executed, to identify a trigger to execute a first event associated with a sound output of an external electronic device, to identify the location of a user within a space where the electronic device is located, to identify information about the sound at the location of the user, and on the basis of the information about the identified sound, to control the properties of a sound outputted by at least one of the external electronic device performing the first event or another external electronic device generating a sound.

13 Claims, 22 Drawing Sheets

(51) Int. Cl.
*G10L 25/51* (2013.01)
*G10L 25/78* (2013.01)
*H04S 7/00* (2006.01)

(58) Field of Classification Search
CPC ...... H04N 21/41265; H03G 3/20; H03G 1/02; H03G 3/32; G06F 16/636; G06F 3/165
USPC ............ 381/77, 82, 105, 107, 110; 704/246
See application file for complete search history.

(56) References Cited

U.S. PATENT DOCUMENTS

| | | |
|---|---|---|
| 2006/0002566 A1 | 1/2006 | Choi et al. |
| 2010/0174546 A1 | 7/2010 | Kim et al. |
| 2013/0279706 A1* | 10/2013 | Marti .................... G06F 1/1688 381/57 |
| 2015/0016642 A1* | 1/2015 | Walsh ..................... H04S 7/301 381/307 |
| 2015/0271465 A1* | 9/2015 | Daub ............... H04N 21/42201 348/51 |
| 2016/0103202 A1 | 4/2016 | Sumiyoshi et al. |
| 2017/0052245 A1 | 2/2017 | Regunathan et al. |
| 2017/0374465 A1 | 12/2017 | Family et al. |
| 2018/0315413 A1* | 11/2018 | Lee ........................... B60L 1/00 |
| 2019/0019513 A1 | 1/2019 | Kirihara |

FOREIGN PATENT DOCUMENTS

| | | |
|---|---|---|
| KR | 10-2006-0000064 A | 1/2006 |
| KR | 10-2010-0081587 A | 7/2010 |
| KR | 10-2017-0094125 A | 8/2017 |

\* cited by examiner

ELECTRONIC DEVICE FOR CONTROLLING SOUND AND OPERATION METHOD THEREFOR

CROSS-REFERENCE TO RELATED APPLICATION(S)

This application is a U.S. National Stage application under 35 U.S.C. § 371 of an International application number PCT/KR2019/001005, filed on Jan. 24, 2019, which is based on and claimed priority of a Korean patent application number 10-2018-0008965, filed on Jan. 24, 2018, in the Korean Intellectual Property Office, the disclosure of which is incorporated by reference herein in its entirety.

TECHNICAL FIELD

Various embodiments relate to an electronic device that controls sound output from at least one of an electronic device or an external electronic device and a method for operating the same.

BACKGROUND ART

Recently, multimedia file-reproduceable electronic devices are proliferating. For example, electronic devices with various speakers, such as TVs, audio players, radios, Bluetooth speakers, smartphones, tablet PCs, or desktop PCs, may play multimedia files and output sound. There are electronic devices capable of adjusting the properties (e.g., the magnitude or amplitude of sound) of sound output from an external electronic device in a remote site. For example, an electronic device may transmit/receive data to/from a speaker-equipped external electronic device via short-range communication or internet communication. Upon receiving a user input associated with, e.g., sound adjustment, the electronic device may transmit a control signal corresponding to the received user input to the external electronic device. The external electronic device may adjust the properties of the output sound based on the received control signal.

DETAILED DESCRIPTION OF THE INVENTION

Technical Problem

When the external electronic device outputs sound, the magnitude of the current sound in the user's position may not be considered and a trouble may thus arise. For example, if the external electronic device outputs a relatively low volume of sound although the current sound magnitude in the user's position is relatively high, the user may not hear the sound from the external electronic device. Or if the external electronic device outputs a relatively low volume of sound when the user is positioned relatively far away from the external electronic device, the user may have difficulty in hearing the sound from the external electronic device.

According to various embodiments, an electronic device and method of operating the same may control the properties of sound output from an external electronic device.

Technical Solution

According to various embodiments, an electronic device comprises a memory configured to store instructions and a processor configured to execute the stored instructions, wherein as the instructions are executed, the processor may be configured to identify a trigger for executing a first event associated with sound output from an external electronic device, identify a user's position in a space where the electronic device is positioned, identify information about sound in the user's position, and control a property of sound output from at least one of the external electronic device performing the first event or another external electronic device generating sound, based on the identified sound information.

According to various embodiments, a method for operating an electronic device may comprise identifying a trigger for executing a first event associated with sound output from an external electronic device, identifying a user's position in a space where the electronic device is positioned, identifying information about a sound in the user's position, and controlling a property of sound output from at least one of the external electronic device performing the first event or another external electronic device generating sound, based on the identified sound information.

Advantageous Effects

According to various embodiments, there may be provided an electronic device and method for operating the same, which may control the properties of sound output from an external electronic device based on the user's position.

MODE FOR CARRYING OUT THE INVENTION

The electronic device according to various embodiments may be one of various types of electronic devices. It should be appreciated that various embodiments of the disclosure and the terms used therein are not intended to limit the techniques set forth herein to particular embodiments and that various changes, equivalents, and/or replacements therefor also fall within the scope of the disclosure. The same or similar reference denotations may be used to refer to the same or similar elements throughout the specification and the drawings. It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the term "module" includes a unit configured in hardware, software, or firmware and may interchangeably be used with other terms, e.g., "logic," "logic block," "part," or "circuit." A module may be a single integral part or a minimum unit or part for performing one or more functions. For example, the module may be configured in an application-specific integrated circuit (ASIC).

Figure 1:
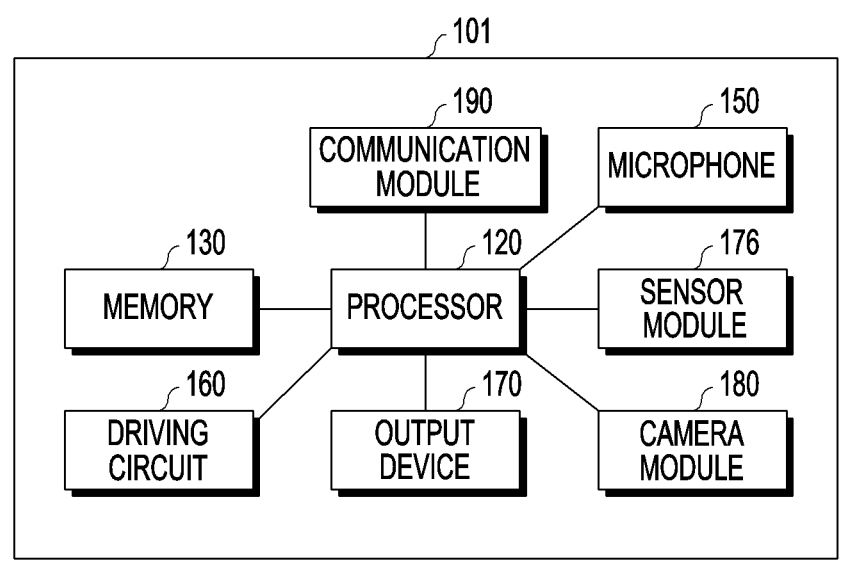
FIG. 1 is a block diagram illustrating an electronic device according to various embodiments.

FIG. 1 is a block diagram illustrating an electronic device according to various embodiments.

Referring to FIG. 1, according to various embodiments, an electronic device 101 may include a processor 120, a memory 130, a microphone 150, a driving circuit 160, an output device 170, a sensor module 176, a camera 180, and a communication module 190.

The processor 120 may drive, e.g., software to control at least one other component (e.g., a hardware or software component) of the electronic device 101 connected with the processor 120 and may process or compute various data. The processor 120 may load and process an instruction or data received from another component (e.g., the sensor module 176 or the communication module 190) on a volatile memory (e.g., an RAM), and the processor 120 may store resultant data in a non-volatile memory (e.g., a NAND). According to an embodiment, the processor 120 may include a main processor (e.g., a central processing unit (CPU) or an application processor), and additionally or alternatively, an auxiliary processor (e.g., a graphics processing unit (GPU), an image signal processor, a sensor hub processor, or a communication processor) that is operated independently from the main processor and that consumes less power than the main processor or is specified for a designated function. Here, the auxiliary processor may be operated separately from or embedded in the main processor. In other words, a plurality of chips or circuits capable of computation may be included in the electronic device 101.

The auxiliary processor may control at least some of functions or states related to at least one component (e.g., the output device 170, sensor module 176, or communication module 190) of the electronic device 101, instead of the main processor while the main processor is in an inactive (e.g., sleep) state or along with the main processor while the main processor is an active state (e.g., executing an application). According to an embodiment, the auxiliary processor (e.g., an image signal processor or a communication processor) may be implemented as part of another component (e.g., a camera 180 or the communication module 190) functionally related to the auxiliary processor. The memory 130 may store various data used by at least one component (e.g., the processor 120 or sensor module 176) of the electronic device 101, e.g., software and input data or output data for a command related to the software. The memory 130 may include a volatile memory or a non-volatile memory. The memory 130 may store the sound map in the space where the electronic device 101 is positioned. The sound map may include information about at least one of the magnitude or frequency of sound corresponding to each of a plurality of cells into which the space has been split. Or, the sound map may include information about the position of a sound source in the space and the properties of sound generated from the sound source. This is described below in greater detail with reference to FIG. 4B. The memory 130 may store algorithms or information for processing various embodiments of the disclosure, such as algorithms for generating sound maps, adjustment information for output sound based on sound maps, adjustment information for output sound based on measured sound, information for priority between events, information for identifying the user's state, algorithms for analyzing obtained voice, or information for priority between a plurality of users. Various pieces of information or identification algorithms described above may be generated via processing, e.g., clustering, on, e.g., a database and may be generated or updated as a result of applying various learning algorithms. According to an embodiment, at least some programs for operation of the electronic device 101 may be stored in an external device (e.g., a server). In this case, the electronic device 101 may send a query to the external device, and the external device may generate a response using data contained in the query and send the response to the electronic device 101. For example, the electronic device 101 may transmit sound property information about the user's current position, as a query, to the server and, in response thereto, obtain information about the sound properties in the user's current position. Or, the electronic device 101 may transmit a query containing the sound property information about the user's current position to the server and, in response thereto, obtain information about the properties of sound output from another external electronic device from the server.

The microphone 150 may convert the ambient sound of the electronic device 101 into an electrical signal and provide the electrical signal to the processor 120. The processor 120 may identify the properties (e.g., at least one of the magnitude or frequency of sound) of ambient sound of the electronic device 101 based on the electrical signal received from the microphone 150. There may be provided a plurality of microphones 150. The processor 120 may identify the position of the sound (e.g., at least one of the direction or distance of the sound) based on electrical signals from the plurality of microphones.

The driving circuit 160 may enable at least part of the electronic device 101 to move. For example, the driving circuit 160 may allow the electronic device 101 to move from a first position to a second position. According to various embodiments, the electronic device 101 may further include wheels, and the driving circuit 160 may include a motor or actuator connected with the wheels. The processor 120 may control the driving circuit 160 to rotate the wheels for the electronic device 101 to move from the first position to the second position or to brake rotation of the wheels. For example, the processor 120 may control the driving circuit 160 to rotate the wheels at a first angular speed at the time of departing from the first position and control the driving circuit 160 to reduce the angular speed of the wheels as the electronic device 101 approaches the second position. Upon identifying that the electronic device 101 arrives at the second position, the processor 120 may control the driving circuit 160 to stop the wheels. According to an embodiment, the electronic device 101 may include a plurality of legs, and the driving circuit 160 may be connected to each of the plurality of legs and may include a motor or actuator for controlling the movement of the legs. The electronic device 101 may include at least one propeller for flying, and the driving circuit 160 may include a motor or actuator for rotating the at least one propeller. The processor 120 may control the driving circuit 160 to move the electronic device 101 to the user's position. Here, the "electronic device 101 moves to the user's position" may mean that the electronic device 101 enters within a preset distance from the user's position. Upon identifying an event execution trigger associated with sound output or a trigger associated with a sound output change, the processor 120 may control the driving circuit 160 to move to the user's position. After moving to the user's position, the processor 120 may identify information about the current sound in the user's position, which is obtained through the microphone 150. The processor 120 may control the properties of sound to be output from at least one of the electronic device 101 or an external electronic device to perform events, based on the identified information about the current sound in the user's position.

The output device 170 may include various kinds of devices, such as a display device, sound output device, or vibration output device. The display device may be a device for visually providing information to a user of the electronic device 101. The display device 2660 may include, e.g., a display, a hologram device, or a projector and a control circuit for controlling the display, hologram device, or projector. According to an embodiment, the display device may include touch circuitry capable of detecting the user's touch input or a pressure sensor capable of measuring the strength of a pressure for the user's touch. The electronic device 101 may display, on the display device, application execution screens, popup windows, indicators, or various UIs for user control or may adjust the brightness of the display. Graphic objects displayed on the display device are not limited thereto. The sound output device may be a device for outputting sound signals to the outside of the electronic device 101. The sound output device may include, e.g., a speaker which is used for general purposes, such as playing multimedia or recording and playing, and a receiver used for call receiving purposes only. According to an embodiment, the receiver may be formed integrally or separately from the speaker. The electronic device 101 may output voice for interaction with the user using various text-to-speech (TTS) programs. Or, the electronic device 101 may output beeps for acknowledging task-fulfilling commands (e.g., sound event fulfilling commands) from the user. Or, the electronic device 101 may adjust the tempo or volume of voice output in response to a task fulfilling command. The vibration output device may convert an electrical signal into a mechanical stimulus (e.g., vibration or motion) or electrical stimulus which may be recognized by the user. The vibration output device may include, e.g., a motor, a piezoelectric element, or an electric stimulator.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, an ultrasonic sensor or an illuminance sensor. The processor 120 may perform, e.g., user identification, user pose recognition, and obstacle detection according to various pieces of information received via the sensor module 176.

The camera 180 may capture a still image or moving images. According to an embodiment, the camera 180 may include one or more lenses, an image sensor, an image signal processor, or a flash. The camera 180 may include a three-dimensional (3D) camera which may be implemented as a stereoscopic camera. The processor 120 may analyze the image obtained via the camera and identify various pieces of information, such as the user position information, relative positions of a plurality of users, the position of an object positioned in an external environment, user identification information, the user's state, or user feedback-associated information.

The communication module 190 may support establishing a wired or wireless communication channel between the electronic device 101 and an external electronic device (e.g., another electronic device or server) and performing communication through the established communication channel. The communication module 190 may include one or more communication processors that are operated independently from the processor 120 (e.g., an application processor) and support wired or wireless communication. According to an embodiment, the communication module 190 may include a wireless communication module (e.g., a cellular communication module or a short-range wireless communication module) or a wired communication module (e.g., a local area network (LAN) communication module or a power line communication (PLC) module). A corresponding one of the wireless communication module and the wired communication module may be used to communicate with an external electronic device through a first network (e.g., a short-range communication network, such as Bluetooth, wireless-fidelity (Wi-Fi) direct, or infrared data association (IrDA)) or a second network (e.g., a long-range communication network, such as a cellular network, the Internet, or a communication network (e.g., LAN or wide area network (WAN)). The above-enumerated types of communication modules 190 may be implemented in a single chip or individually in separate chips. According to an embodiment, the wireless communication module may differentiate and authenticate the electronic device 101 in the communication network using user information stored in the subscriber identification module.

Some of the above-described components may be connected together through an inter-peripheral communication scheme (e.g., a bus, general purpose input/output (GPIO), serial peripheral interface (SPI), or mobile industry processor interface (MIPI)), communicating signals (e.g., instructions or data) therebetween.

According to an embodiment, instructions or data may be transmitted or received between the electronic device 101 and the external electronic device via the server coupled with the second network. According to an embodiment, all or some of operations executed on the electronic device 101 may be run on one or more other external electronic devices. According to an embodiment, when the electronic device 101 should perform a certain function or service automatically or at a request, the electronic device 101, instead of, or in addition to, executing the function or service on its own, may request an external electronic device to perform at least some functions associated therewith. The external electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technology may be used, for example.

Figure 2A:
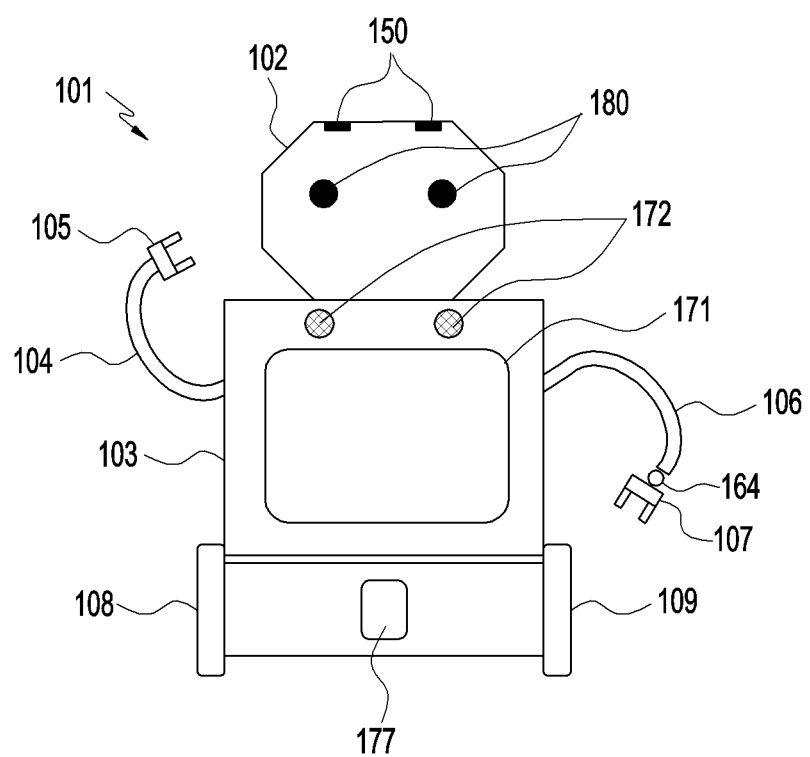
FIG. 2A is a front view illustrating an electronic device according to various embodiments.

FIG. 2A is a front view illustrating an electronic device according to various embodiments.

According to various embodiments, the electronic device 101 may be shaped as a robot that may move as wheels rotate. The electronic device 101 may include a first housing 102 and a second housing 103. The first housing 102 may be shaped as, e.g., a robot's head, and the second housing 103 may be shaped as, e.g., the robot's body. However, the shape of the housing 102 and 103 is not limited thereto. The camera 180 may be positioned in the first housing 102, and the camera 180 may be exposed through at least a portion of the first housing 102 to receive images from the outside. According to various embodiments, the electronic device 101 may include a plurality of cameras 180, and the plurality of cameras 180 may form a stereoscopic camera. Thus, the electronic device 101 may identify the depth information about objects included in the captured image and identify information about the position of the subject in three dimensions. The microphone 150 may be positioned in the first housing 102, and the microphone 150 may be exposed through at least another portion of the first housing 102. According to various embodiments, the electronic device 101 may include a plurality of microphones 150. The electronic device 101 may detect a difference between the times of reception of sounds from the plurality of microphones 150 and identify information about the position where the sound occurs based on the detected time difference, which is described below. The speaker 172 may be positioned in the second housing 103, and the speaker 172 may be exposed through at least a portion of the second housing 103. According to various embodiments, the electronic device 101 may include a plurality of speakers 172. The display 171 may be positioned in the second housing 103, and the display 171 may be exposed through at least another portion of the second housing 103. The electronic device 101 may display various visual items through the display 171 to the user. A distance sensor 177 may be positioned inside or on the surface of the second housing 103. The distance sensor 177 may include a proximity sensor capable of identifying, e.g., whether an obstacle is positioned in a specific direction. The proximity sensor may be implemented as, e.g., an optical sensor, and the electronic device 101 may identify whether the obstacle is positioned according to a variation in the amount of light incident onto the optical sensor due to the obstacle. The distance sensor 177 may include a sensor including, e.g., an ultrasonic wave generation circuit and an ultrasonic wave reception circuit. The distance sensor 177 may generate an ultrasonic wave and receive the wave reflected by the obstacle. The electronic device 101 may analyze the properties of the reflected wave and identify the position of the obstacle according to the result of analysis. The distance sensor 177 may include, e.g., a light source, such as a laser or infrared light source, and an optical sensor. The distance sensor 177 may generate laser or infrared rays and receive the light reflected by the obstacle using the optical sensor. The electronic device 101 may identify the distance to the obstacle using the time-of-flight (TOF) of light. The electronic device 101 may include other various distance sensors than that described above, and it will be easily appreciated by one of ordinary skill in the art that the distance is not limited to a specific kind. The electronic device 101 may detect an obstacle in front of the electronic device 101 via the distance sensor 177 and move along the path getting around the obstacle, rather than a predetermined path, so as to avoid collision with the obstacle while moving. An end of a first arm 104 and an end of a second arm 106 may be connected to the second housing 103. A first hand 105 may be connected to the other end of the first arm 104, and a second hand 107 may be connected to the other end of the second arm 106. For example, a rotating means 164 (e.g., a motor or actuator) may be positioned between the second arm 106 and the second hand 107, and the second hand 107 may be rotated as the rotating means 164 spins. A rotating means may also be included between the first arm 104 and the first hand 105. The first hand 105 or the second hand 107 may include at least one finger, and the electronic device 101 may include a rotating means to fold or unfold each finger. The electronic device 101 may include at least one rotating means to allow the first housing 102 to rotate on the second housing 103 of the electronic device 101, and it will be easily appreciated by one of ordinary skill in the art that the movement of the electronic device 101 and the rotating means corresponding thereto are not limited to a specific kind or position.

Figure 2B:
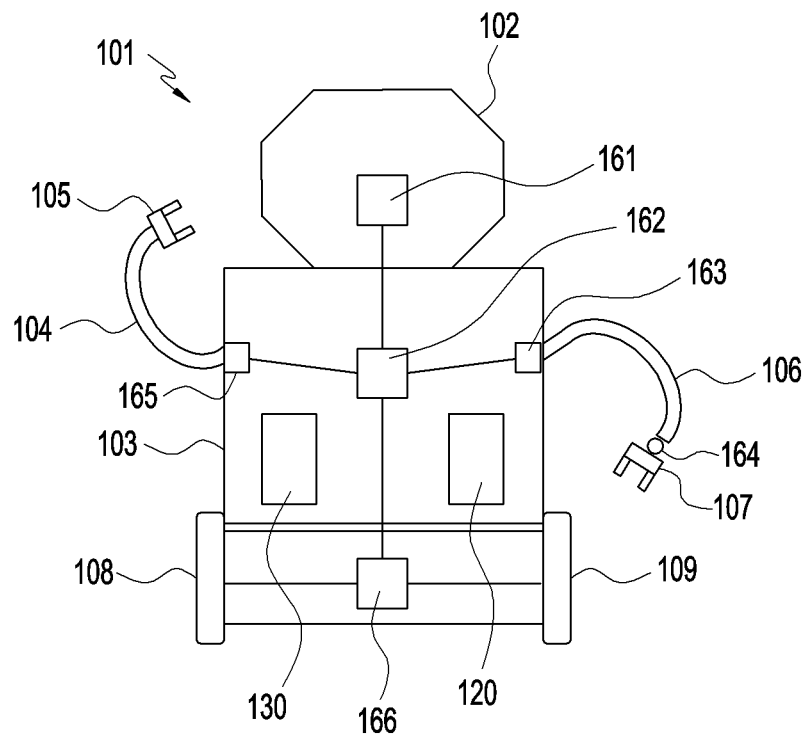
FIG. 2B is a view illustrating a rotating means of an electronic device according to various embodiments.

FIG. 2B is a view illustrating a rotating means of an electronic device according to various embodiments. A motor 161 may be positioned in the first housing 102 and, as the motor 161 spins, the first housing 102 may rotate. As described above in connection with FIG. 2B, the first housing 102 may include at least one camera 180 as mentioned above in connection with FIG. 2A and, as the motor 161 rotates, the capturing direction of the electronic device 101 may be varied. For example, to alter the capturing direction, the electronic device 101 may control the angle or degree of rotation of the motor 161, corresponding to the degree of change in the capturing direction, thus allowing the camera 180 to be directed in a desired capturing direction. There may be provided, e.g., a plurality of motors 161 and, as the plurality of motors rotate, the first housing 102 may rotate in a left-to-right direction or in a top-to-bottom direction. If the first housing 102 includes three motors, the electronic device 101 may rotate the first housing 102 in three directions, e.g., roll, pitch, and yaw, and the number of motors is not limited to a specific number. A plurality of motors 162, 163, and 165 may be included in the second housing 103. The electronic device 101 may rotate the motor 162 to perform motion of the second housing 103. The electronic device 101 may rotate the motors 163 and 165 to perform motion on each of the first arm 104 and the second arm 106. The electronic device 101 may rotate the motor 164 to perform hand motion. The electronic device 101 may rotate the motor 166 to rotate the wheels 108 and 109. Meanwhile, the processor 120 and the memory 130 may be included in the second housing 103. Although FIG. 2B illustrates an example in which the processor 120 and the memory 130 are included in the second housing 103, the processor 120 and the memory 130 may be included in the first housing 102 depending on the design.

Figure 2C:
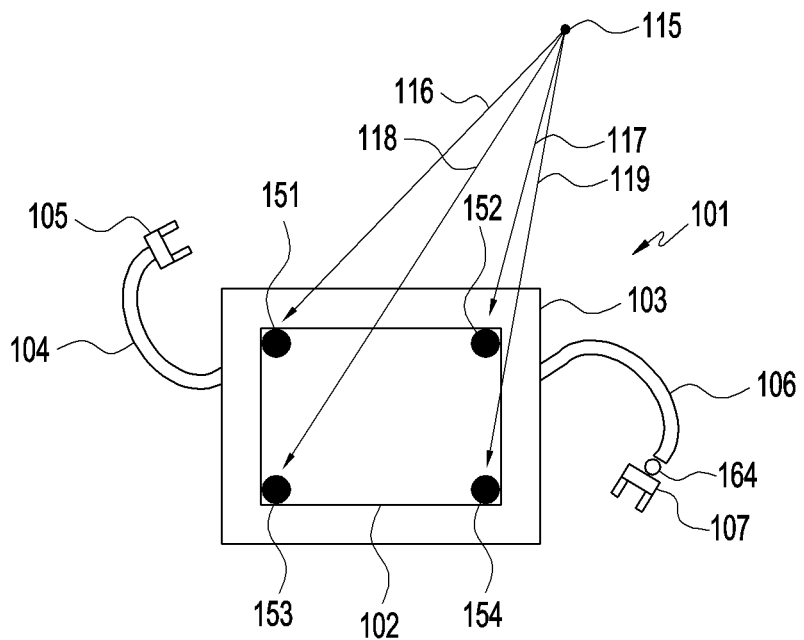
FIG. 2C is a plan view illustrating an electronic device to describe an arrangement of a plurality of microphones according to various embodiments.

FIG. 2C is a plan view illustrating an electronic device to describe an arrangement of a plurality of microphones according to various embodiments.

Referring to FIG. 2C, according to various embodiments, microphones 151, 152, 153, and 154 may be positioned at a plurality of points of the first housing 102. For example, it is assumed that sound is generated at the first point 115. The distance between the first point 115 and the microphone 151 may be a first distance 116, the distance between the first point 115 and the microphone 152 may be a second distance 117, the distance between the first point 115 and the microphone 153 may be a third distance 118, and the distance between the first point 115 and the microphone 154 may be the fourth distance 119. Because of different distances, the voice generated at the first point 115 may be received by the microphones 151, 152, 153, and 154 at different times. The electronic device 101 may identify a relative direction of the origin of sound (e.g., the first point 115) generated for the electronic device 101 using the times (e.g., t1, t2, t3, and t4) when the sound is received by the microphones 151, 152, 153, and 154. For example, the electronic device 101 may identify the relative direction of the origin of sound using time difference information of t1-t2, t1-t3, t1-t4, t2-t3, t2-t4, and t3-t4. The electronic device 101 may identify the relative direction of the origin of sound using a program or algorithm capable of identifying direction stored in the memory 130. Or, the electronic device 101 may identify the relative direction of the origin of sound using a lookup table between per-microphone reception time difference and the origin of sound. The electronic device 101 may identify the relative direction of the origin of sound by various methods, e.g., time difference of arrival (TDOA) or frequency difference of arrival (FDOA), and programs or algorithms for such identification are not limited to a specific kind.

Figure 3A:
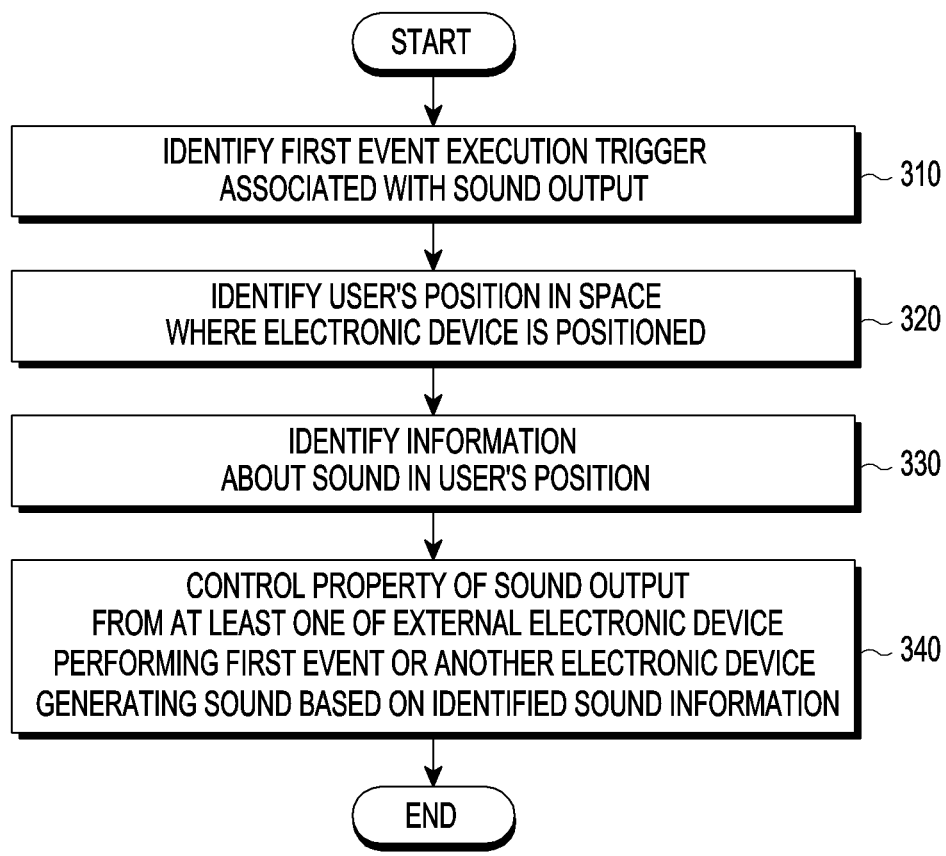
FIG. 3A is a flowchart illustrating a method for operating an electronic device according to various embodiments.

FIG. 3A is a flowchart illustrating a method for operating an electronic device according to various embodiments.

In operation 310, the electronic device 101 may identify a first event execution trigger associated with sound output. "Electronic device 101 performs a particular operation" may mean, e.g., that the processor 120 of the electronic device 101 performs the particular operation or controls other hardware to perform the particular operation. "Electronic device 101 performs a particular operation" may mean, e.g., that, as at least one instruction stored in the memory 130 of the electronic device 101 is executed, the processor 120 performs the particular operation or controls other hardware to perform the particular operation. For example, the electronic device 101 may identify a command to enable the electronic device 101 or other external electronic device to play multimedia content from the user, as the first event execution trigger associated with sound output. The electronic device 101 may receive a command to execute the operation of generating noise, rather than playing multimedia content, such as a command to drive a washer or a command to drive a robot vacuum. The electronic device 101 (or external server) may store information about noise generated per operation mode when a washer or robot vacuum operates and may identify a command to execute the operation of generating noise, as the first event execution trigger associated with sound output.

According to various embodiments, the electronic device 101 may receive a command generated by the user's manipulation and obtain a trigger. For example, the user may manipulate an electronic device in possession (e.g., a smartphone or wearable electronic device) to input a first event execution command associated with sound output on an external electronic device (e.g., a TV). The electronic device possessed by the user may transmit a communication signal containing the first event execution command to at least one of the electronic device 101 or the external electronic device. The electronic device 101 may identify the first event execution command contained in the communication signal as the first event execution trigger. The electronic device 101 may receive the communication signal based on various communication schemes (e.g., infrared communication, short-range communication, or Internet communication). The electronic device 101 may analyze the voice command obtained through the microphone 150 and identify the first event execution command associated with sound output on the external electronic device (e.g., a TV) based on the result of analysis. For example, the electronic device 101 may convert the received voice command into text by automatic speech recognition (ASR) and apply natural language understanding (NLU) on the text, thereby analyzing the meaning corresponding to the voice command. The electronic device 101 may identify that the meaning is associated with sound output on the electronic device 101 or external electronic device. Or, the electronic device 101 may identify the first event execution trigger associated with sound output from an external electronic device, not from the user. For example, when a TV is configured to automatically play on at a specific time, the TV may transmit a communication signal to indicate the play schedule to the electronic device 101. The electronic device 101 may identify the information included in the communication signal as the first event trigger associated with sound output. As described above, the electronic device 101 may identify the event execution trigger associated with sound output on at least one of the electronic device 101 or other electronic device according to various schemes, and it will be easily appreciated by one of ordinary skill in the art that identifying the event execution trigger by the electronic device 101 is not limited to a specific scheme.

In operation 320, the electronic device 101 may identify the user's position in the space where the electronic device 101 is positioned. For example, the electronic device 101 may identify the user's position according to various positioning schemes. For example, the electronic device 101 may capture at least one scene for the space where the electronic device 101 is positioned and analyze the result of capturing, identifying the user's position. The electronic device 101 may identify the user's position relative to the electronic device 101 or may identify the user's absolute position in the space defined by the electronic device 101. When the electronic device 101 identifies the user's absolute position, the electronic device 101 may identify the user's position in the sound map. The electronic device 101 may identify the user's position in a scheme other than image capturing. For example, the electronic device 101 may transmit an RF wave or ultrasonic wave and receive and analyze its reflection, thereby identifying the user's position.

Or, the electronic device 101 may identify the user's position based on the communication signal transmitted from the external electronic device identified to be worn on the user. The electronic device 101 may receive the communication signal including information about the user's position from an external positioning device.

Figure 3B:
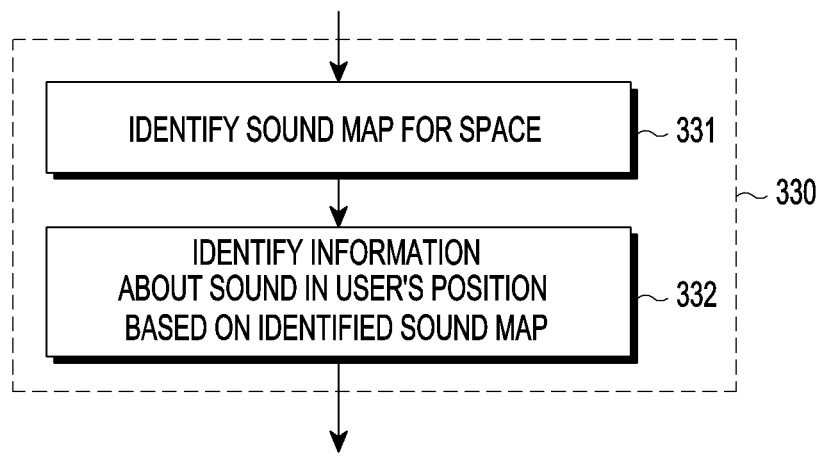
FIG. 3B is a flowchart illustrating a method for operating an electronic device according to various embodiments.

In operation 330, the electronic device 101 may identify information about the sound in the user's position. According to various embodiments, as shown in FIG. 3B, in operation 331, the electronic device 101 may identify a sound map for sound. The sound map may include information about at least one of the magnitude or frequency of sound corresponding to each of a plurality of cells into which the space where the electronic device 101 is positioned has been split. For example, the sound map may be a map representing the properties of the current sound for each of a plurality of points in the space where the electronic device 101 is positioned. The data structure of the sound map is described below in greater detail with reference to FIG. 4B. The electronic device 101 may directly move to at least some points among the plurality of points in the space, measure the sound, and generate a sound map. The electronic device 101 may compute the properties of the sounds at the other points where no measurement has been conducted, based on the properties of the sound measured in the at least one of some points. For example, the electronic device 101 may apply an interpolation scheme on the measured data, generating a sound map. Or, the electronic device 101 may generate a sound map based on sound measurement-related information from another sound measuring device. For example, it is possible to measure sound in the point from another sound measuring device (e.g., a smartphone or watch-type wearable electronic device) including a microphone in the space where the electronic device 101 is positioned. The other sound measuring device may transmit the measured sound-related information to the electronic device 101 and generate a sound map based on the received sound-related information. In operation 332, the electronic device 101 may identify information about the sound in the user's position based on the identified sound map. For example, the electronic device 101 may identify the cell corresponding to the user's position among the plurality of cells constituting the sound map and identify information designated corresponding to the cell, as information about the sound in the user's position. In the instant embodiment, the electronic device 101 may not include the driving circuit 160. Or, the electronic device 101 may directly generate a sound map and receive a sound map from another electronic device, such as a home server. The electronic device 101 may update a sound map in each cycle. Or, upon detecting a change in sound information measured in the current position, the electronic device 101 may update the sound map, corresponding thereto.

Figure 3C:
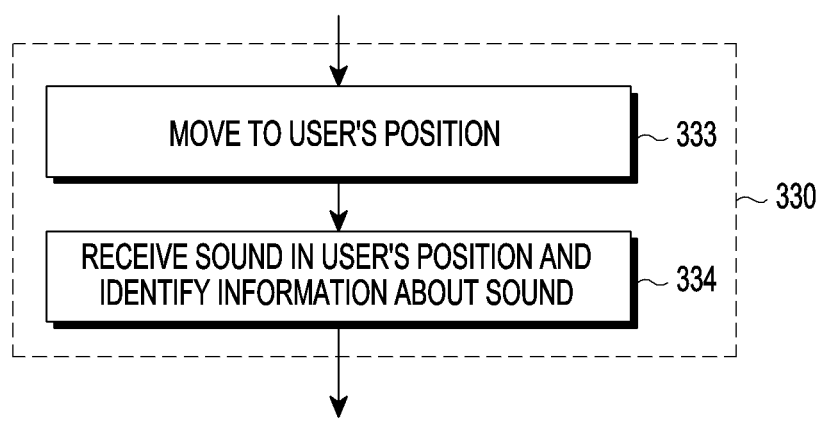
FIG. 3C is a flowchart illustrating a method for operating an electronic device according to various embodiments.

In another embodiment, as shown in FIG. 3C, the electronic device 101 may move to the user's position in operation 333. In operation 334, the electronic device 101 may receive sound in the user's position and identify information about the sound based on the received sound. In this case, the electronic device 101 may manage the sound map and may directly move to the user's position at every trigger detection time, identifying information about sound.

In operation 340, the electronic device 101 may control the properties of sound output from at least one of the external electronic device performing a first event or other electronic device generating sound, based on the identified information about a sound. For example, the electronic device 101 may control the properties (e.g., at least one of the magnitude or frequency of sound) of the sound, which the electronic device 101 directly outputs, based on the sound information in the user's position. Or, the electronic device 101 may control the properties of sound output from the external electronic device to perform the first event based on the sound information in the user's position. Or, the electronic device 101 may control the properties of sound output from another electronic device generating noise or outputting the current sound, which differs from the external electronic device for performing the first event, based on the sound information in the user's position.

Figure 4A:
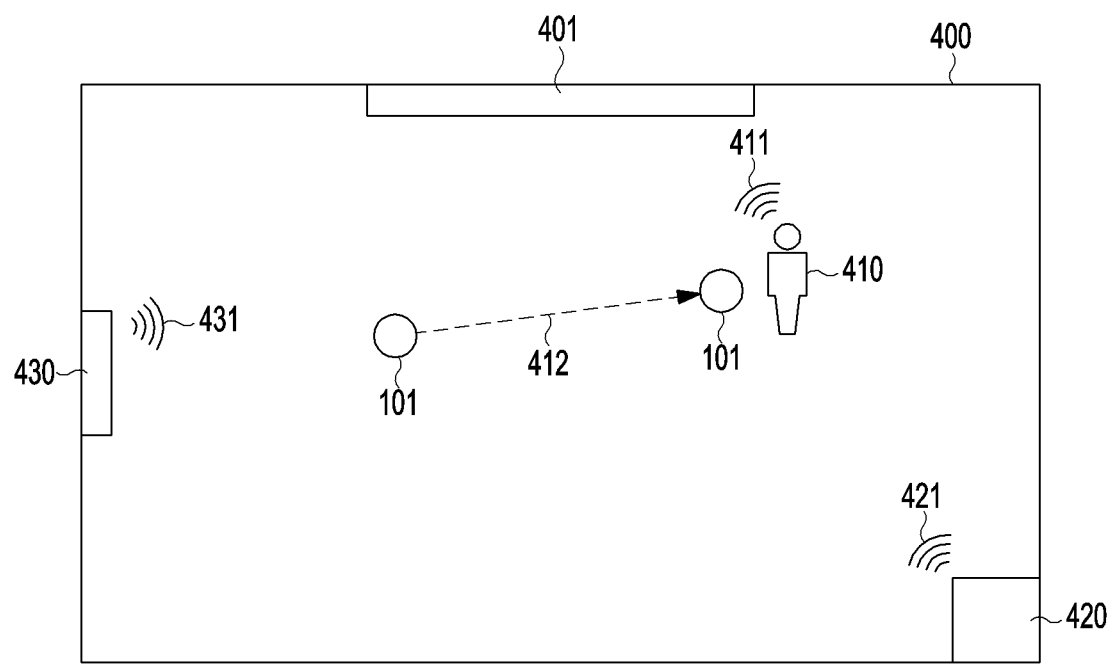
FIG. 4A is a view illustrating a method for operating an electronic device according to various embodiments.

FIG. 4A is a view illustrating a method for operating an electronic device according to various embodiments.

As shown in FIG. 4A, at least one sound-generating external electronic device 401 and 420 and an external electronic device 430 which generates noise when driven may be positioned in the space 400 where the electronic device 101 is positioned. The electronic device 101 may obtain a voice 411 of a user 410 through a microphone. For example, the user 410 may utter the voice 411 saying "Turn on the TV." The electronic device 101 may obtain text corresponding to an electrical signal converted into by the microphone by applying automatic speech recognition on the electrical signal. The electronic device 101 may apply natural language understanding to the obtained text, obtaining the result of understanding of the text. The electronic device 101 may identify the event corresponding to the voice based on, at least, the result of understanding. For example, the electronic device 101 may apply ASR and NLU to the electrical signal corresponding to the voice saying, "Turn on the TV," identifying that the event corresponding to the voice is "turn on the TV." According to various embodiments, the electronic device 101 may perform pre-processing on the electrical signal obtained from the microphone or may transmit the electrical signal, as it is, to an external server (not shown) via the communication module 190. The external server may apply ASR and NLU to the received voice-corresponding electrical signal and, based on, at least, the result of application, identify the same as the event that the electronic device 101 or external electronic device 401, 402, or 403 is supposed to perform. The external server may transmit the identified event-related information to the electronic device 101, and the electronic device 101 may identify the event based on, at least, the received information. The external server may transmit the result of NLU processing, as it is, to the electronic device 101 or may transmit information about sequential execution processes of at least one subevent supposed to be performed by the electronic device 101 according to the result of NLU processing. The electronic device 101 may be operated according to the result of NLU processing or may perform a subevent according to the sequential execution process. Or, the electronic device 101 may perform ASR on the electrical signal to obtain text and may transmit information associated with the text to the external server. The external server may apply NLU to the received text-associated information and identify the event to be performed by the electronic device 101 based on, at least, the result of the application. The external server may transmit the identified event-related information to the electronic device 101, and the electronic device 101 may identify the event based on, at least, the received information.

According to at least part of the above-described process, the electronic device 101 may identify that the command from the user 410 is an event to turn on the external electronic device 401. The electronic device 101 may identify that the turning-on of a TV is an event associated with sound output and, corresponding thereto, move (412) to the position of the user 410. The electronic device 101 may identify in advance the position of the user 410 and may control the driving circuit 160 to move a position corresponding to the position of the user 410, e.g., around the user 410. The electronic device 101 may move (412) to the position of the user 410 and may then identify information about the sound in the position. For example, in the position, the sound 421 output from the external electronic device 420 and the noise 431 generated by the external electronic device 430 may be transferred. The electronic device 101 may measure the sound in the position and may identify information about the sound (e.g., at least one of the magnitude or frequency of the sound). The electronic device 101 may control the properties of the sound output from the external electronic device 401 based on the sound magnitude information. For example, when the current magnitude of sound in the position of the user 410 is relatively large, the electronic device 101 may control the magnitude of sound output from the external electronic device 401 to be relatively large. Or, when the current sound magnitude in the position of the user 401 is relatively small, the electronic device 101 may control the sound output from the external electronic device 401 to be relatively small. According to various embodiments, the electronic device 101 may control the properties of the sound output from the external electronic device 401 after the external electronic device 401 turns on. Or, before the external electronic device 401 turns on, the electronic device 101 may preset the properties of the sound that the external electronic device 401 is to output and control the external electronic device 401 to output sound immediately when turned on, according to the settings.

Figure 4B:
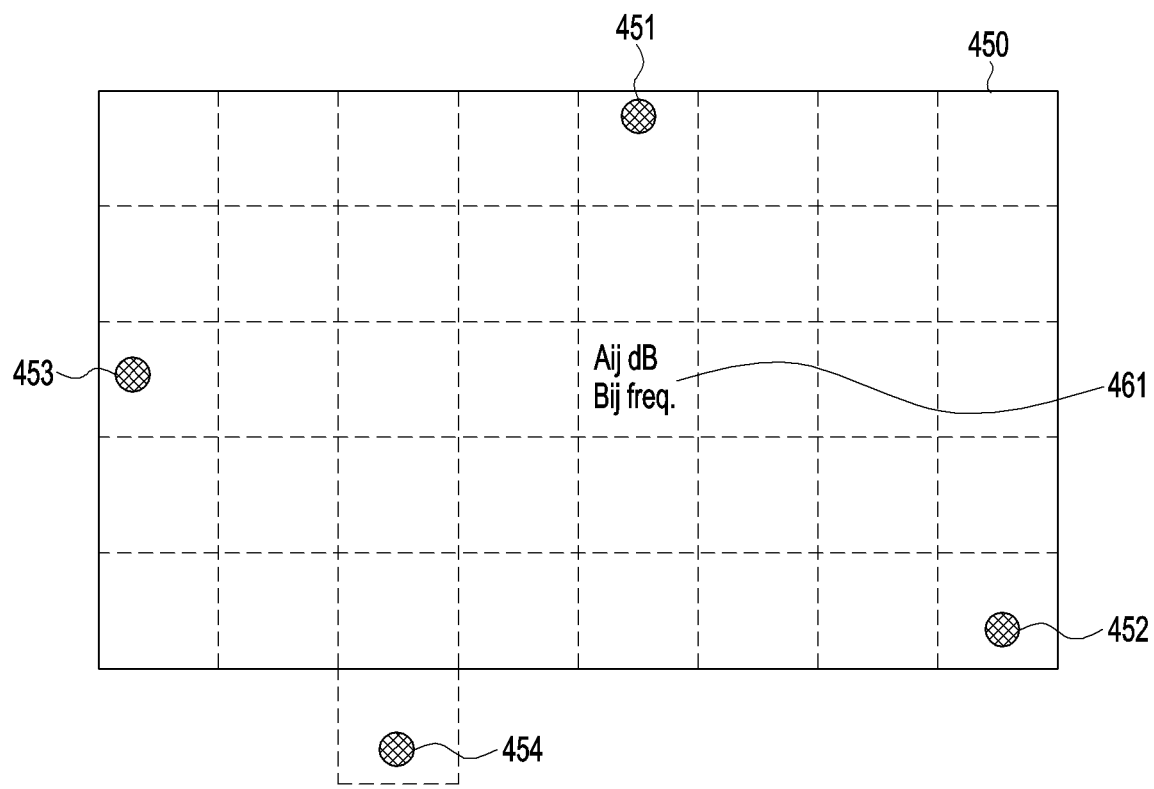
FIG. 4B illustrates a sound map according to various embodiments.

FIG. 4B illustrates a sound map according to various embodiments.

As shown in FIG. 4B, the electronic device 101 may store a sound map 450 corresponding to the space 400 where the electronic device 101 is positioned. The sound map 450 may include a plurality of partitioned cells, and each cell may correspond to a physical space of the space 400. Information about sound may be mapped and stored in each cell. For example, for the (i,j)th cell 461 of the sound map 450, information about the magnitude of Aij dB and information about the frequency of Bij Hz may be mapped. The magnitude and frequency information shown in FIG. 4B is merely an example, and the sound map 450 according to various embodiments may include any sound property information without limitations. Further, the sound map 450 may further include sound source information. For example, as shown in FIG. 4B, the sound map 450 may include information about the positions of at least one sound source 451, 452, 453, and 454. For example, the electronic device 101 may identify the positions of the external electronic devices 401 and 420 outputting sound and reflect the positions in the sound map 450. Or, the electronic device 101 may identify the cell (e.g., 453 or 454) with the local peak in the sound magnitude as the position of the sound source. According to various embodiments, the electronic device 101 may manage the sound source 454 for an external point of the physical space 450. Upon detecting an event trigger associated with sound output, the electronic device 101 may identify the user's position corresponding thereto. For example, upon identifying that the user's position corresponds to the (i,j)th cell 461 of the sound map 450, the electronic device 101 may identify the information about the sound of the (i,j)th cell 461 as information about sound in the user's position. In other words, the electronic device 101 may identify the information about the sound in the user's position without directly moving to the user's position. In this case, the electronic device 101 may include no driving circuit for moving. Based on the identified information about the sound in the user's position, the electronic device 101 may control the properties of the sound output from at least one of the electronic device 101, an external electronic device (e.g., the external electronic device 401) for performing an event, or another external electronic device (e.g., the external electronic device 420). Or, based on the identified information about the sound in the user's position, the electronic device 101 may control at least one of whether the operation of the external electronic device 430 causing noise is performed or the performance of the operation, based on the identified information about the sound in the user's position. For example, upon identifying that the magnitude of sound in the user's position is relatively large, the electronic device 101 may control the external electronic device 420 to reduce the magnitude of sound output from the external electronic device 420. Or, upon identifying that the magnitude of the sound in the user's position is relatively large, the electronic device 101 may stop the operation of the external electronic device 430 or reduce the performance of the operation to reduce the noise caused by the external electronic device 430.

Figure 5:
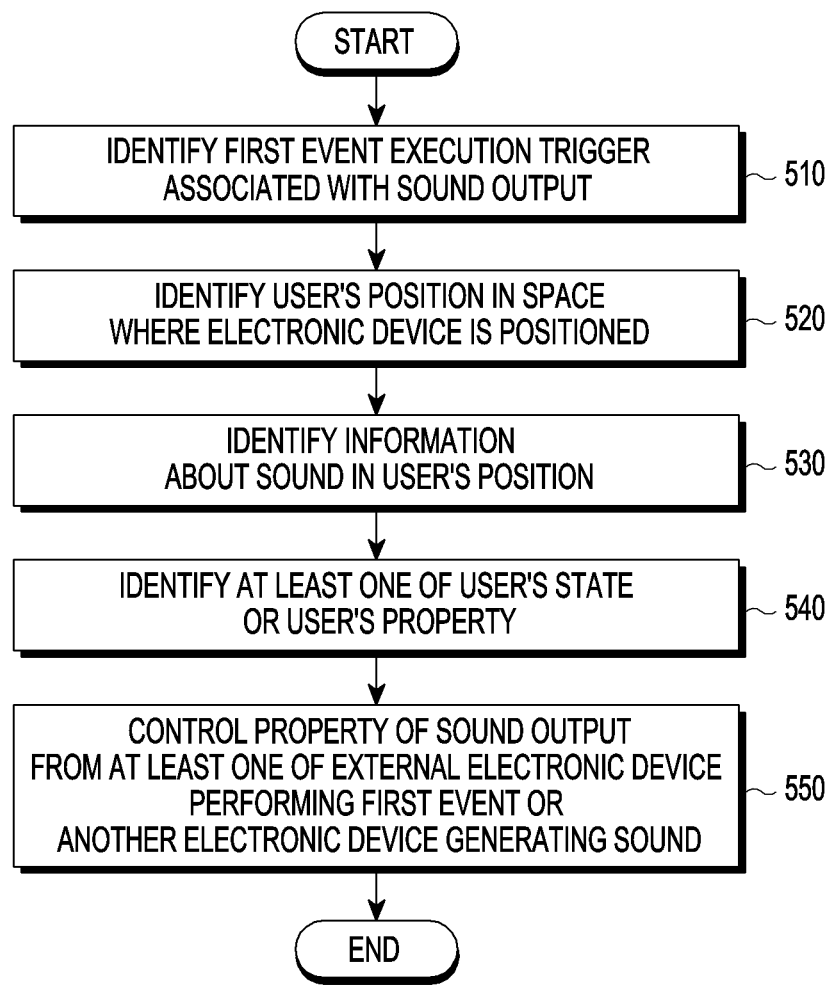
FIG. 5 is a flowchart illustrating a method of operating an electronic device according to various embodiments.

FIG. 5 is a flowchart illustrating a method of operating an electronic device according to an embodiment.

According to various embodiments, in operation 510, the electronic device 101 may identify a first event trigger associated with sound output. In operation 520, the electronic device 101 may identify the user's position in the space where the electronic device 101 is positioned. In operation 530, the electronic device 101 may identify information about the sound in the user's position. In operation 540, the electronic device 101 may identify at least one of the user's state or property. For example, the user's state may be parameters that are changeable even without additional settings and may include, e.g., the user's posture, degree of concentration, whether the user is asleep, or whether the user talks with another person. For example, the user properties may be parameters that are not changeable without entry of an additional setting and may include various parameters, such as the user's age, gender, or preferred sound properties. In operation 550, the electronic device 101 may control the properties of sound output from at least one of the external electronic device performing the first event or another electronic device generating sound. The electronic device 101 may control the properties of sound output from the electronic device 101 or external electronic device, further considering at least one of the user's state or property in addition to the information about the sound in the user's position.

For example, upon identifying that the current magnitude of sound in the user's position is a first magnitude, the magnitude of sound output from the external electronic device may be controlled to differ depending on whether the user is in a lying or sitting position. For example, upon identifying that the current magnitude of sound in the user's position is the first magnitude, the magnitude of sound output from the external electronic device may be controlled to differ depending on whether the user wakes up or is sleeping. For example, upon identifying that the current sound magnitude in the user's position is the first magnitude, the magnitude of sound output from the external electronic device may be controlled to differ depending on the user's degree of concentration. For example, upon identifying that the current sound magnitude in the user's position is the first magnitude, the magnitude of sound output from the external electronic device may be controlled to differ depending on whether the user talks with another person. For example, upon identifying that the current sound magnitude in the user's position is the first magnitude, the magnitude of sound output from the external electronic device may be controlled to differ depending on the user's age, gender, or preferred sound property.

Figure 6:
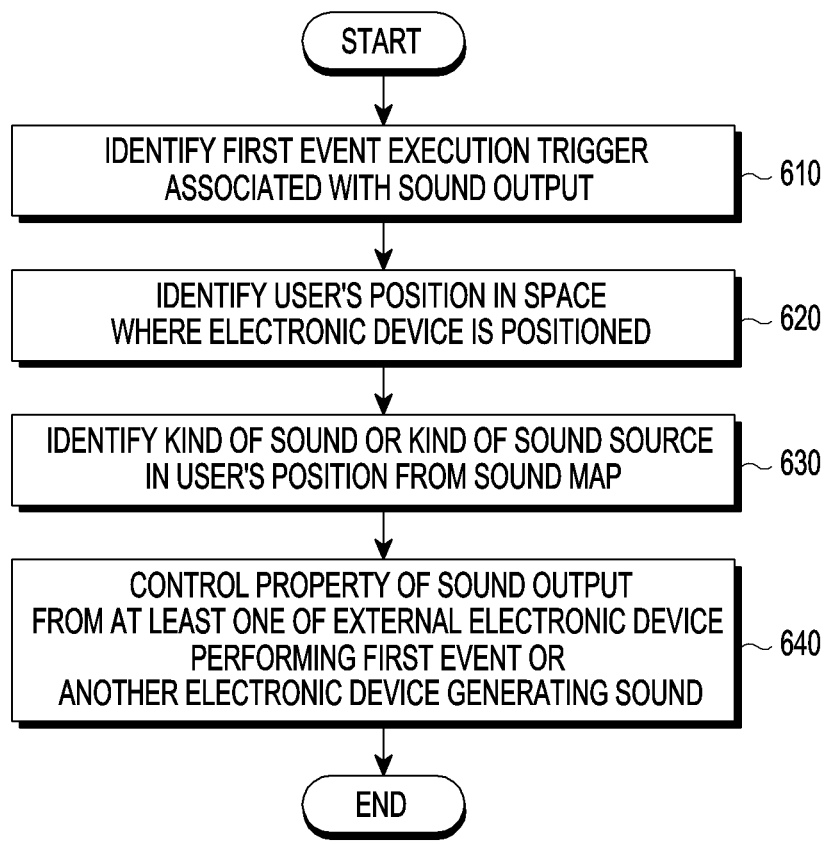
FIG. 6 is a flowchart illustrating a method for operating an electronic device according to various embodiments.

FIG. 6 is a flowchart illustrating a method for operating an electronic device according to an embodiment.

According to various embodiments, in operation 610, the electronic device 101 may identify a first event execution trigger associated with sound output. In operation 620, the electronic device 101 may identify the user's position in the space where the electronic device 101 is positioned. In operation 630, the electronic device 101 may identify the kind of sound or the kind of sound source in the user's position from the sound map. According to various embodiments, the sound map may include, together, information about the kind of sound source and the position of sound source. The sound map may also include information about the kind of sound in each of the plurality of cells. For example, information about the kind of sound, indicating that there is a music sound from an audio component or noise from a washer in the (i,j)th cell may be included in the sound map. In operation 640, the electronic device 101 may identify at least one of the kind of sound or the kind of sound source from the sound map and, based thereupon, control the properties of sound output from other electronic device. For example, upon identifying that the sound magnitude in the user's position is the first magnitude, the electronic device 101 may control the sound output from the other electronic device to have a different property depending on the kind of the sound in the user's position. For example, upon identifying that the sound magnitude in the user's position is the first magnitude, the electronic device 101 may control the sound output from the other electronic device to have a different property depending on the kind of the sound source generating the sound in the user's position. Meanwhile, according to another embodiment, the electronic device 101 may move to the user's position and then measure and analyze sound in the position, thereby identifying at least one of the kind of sound or the kind of sound source.

Figure 7:
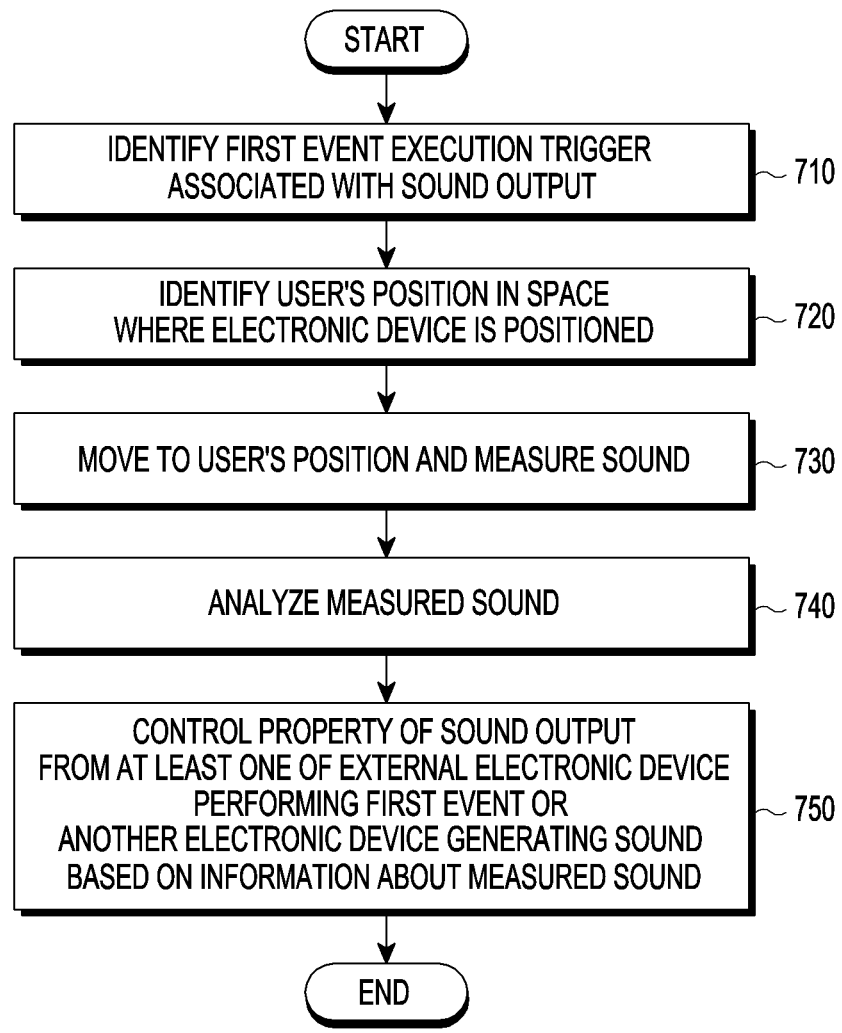
FIG. 7 is a flowchart illustrating a method for operating an electronic device according to various embodiments.

FIG. 7 is a flowchart illustrating a method for operating an electronic device according to an embodiment.

According to various embodiments, in operation 710, the electronic device 101 may identify a first event execution trigger associated with sound output. In operation 720, the electronic device 101 may identify the user's position in the space where the electronic device 101 is positioned. In operation 730, the electronic device 101 may move to the user's position and measure the sound. In operation 740, the electronic device 101 may analyze the measured sound. For example, the electronic device 101 may identify the kind of sound included in the measured sound. The electronic device 101 may compare the measured sound with various kinds of sound databases previously stored and identify the kind of sound based on the result of comparison. A recognition algorithm for identifying the kind of sound may be stored in the electronic device 101 and may be obtained as a result of, e.g., bigdata-based learning. In operation 750, the electronic device 101 may control the properties of sound output from at least one of the external electronic device performing the first event or other electronic device generating sound based on the measured sound information.

Figure 8:
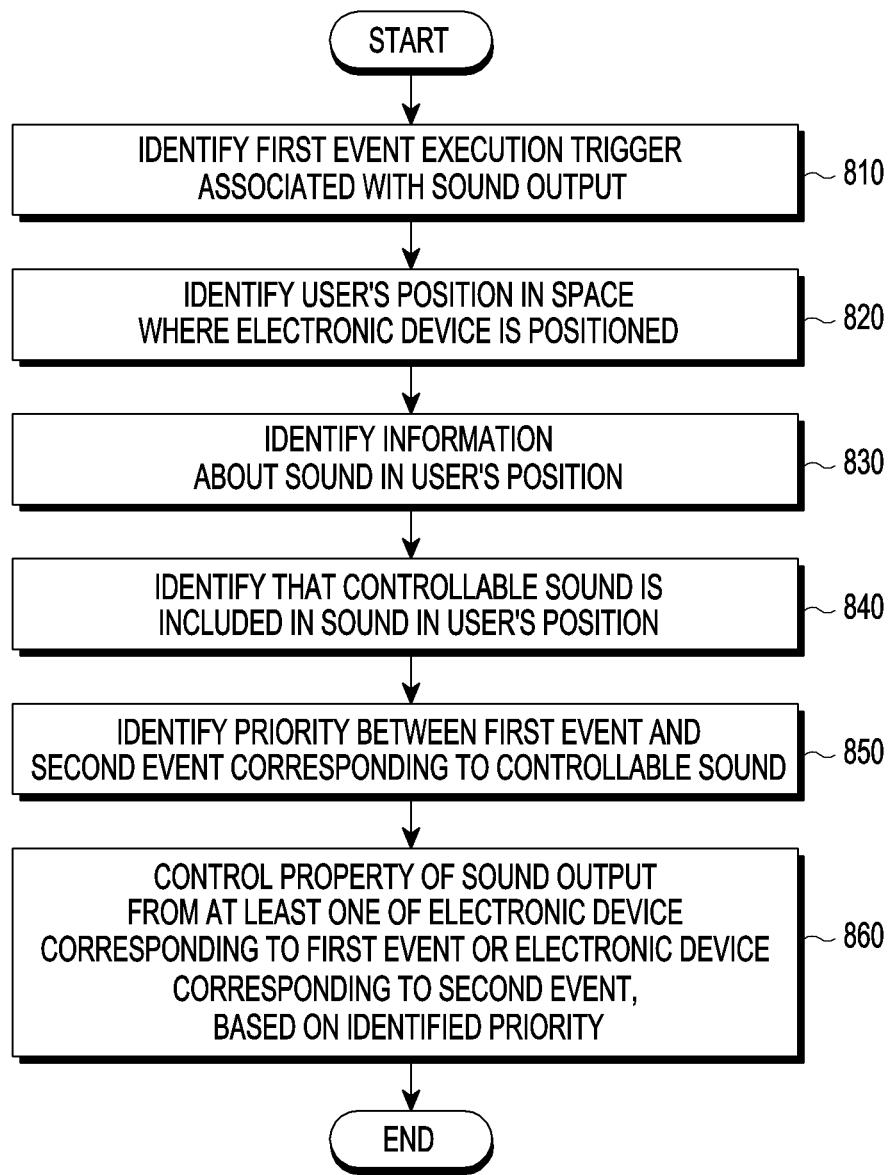
FIG. 8 is a flowchart illustrating a method for operating an electronic device according to various embodiments.
Figure 9:
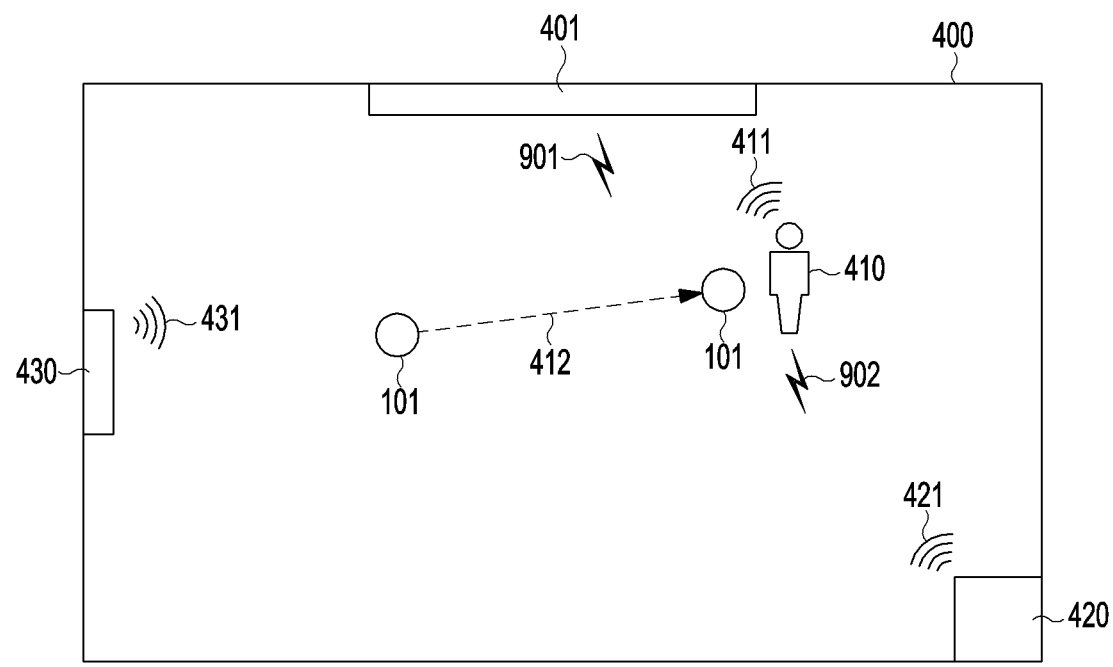
FIG. 9 is a view illustrating operations of an electronic device according to various embodiments.

FIG. 8 is a flowchart illustrating a method for operating an electronic device according to an embodiment of the present invention. The embodiment shown in FIG. 8 is described in greater detail with reference to FIG. 9. FIG. 9 is a view illustrating operations of an electronic device according to various embodiments.

According to various embodiments, in operation 810, the electronic device 101 may identify a first event execution trigger associated with sound output. In operation 820, the electronic device 101 may identify the user's position in the space where the electronic device 101 is positioned. In operation 830, the electronic device 101 may identify the information about sound in the user's position. For example, as shown in FIG. 9, the electronic device 101 may move (412). The electronic device 101 may measure the current sound in the position of the user 410 and identify the information about the sound. The electronic device 101 may identify that a sound 421 from the audio component (e.g., the external electronic device 420) and operation noise from a washer (e.g., the external electronic device 430) in the position of the user 410 are heard. For example, the electronic device 101 may extract the features of the sound measured in the position of the user 410, compare the extracted sound features with features stored in the database, and identify at least one of the kind of sound or the kind of sound source. For example, the electronic device 101 may identify the sound 421 from the audio component (e.g., the external electronic device 420) and the operation noise 431 from the washer (e.g., the external electronic device 430) in the position of the user 410. In operation 840, the electronic device 101 may identify that the sound in the user's position includes a controllable sound. For example, the electronic device 101 may identify that the sound 421 from the audio component (e.g., the external electronic device 420) is a controllable sound. The electronic device 101 may identify that the operation noise 431 from the washer (e.g., the external electronic device 430) is a uncontrollable sound.

In operation 850, the electronic device 101 may identify the priority between the first event and the second event corresponding to the controllable sound. For example, when the first event is "turn on the TV" and the controllable sound-corresponding second event is "play music on the audio component," the electronic device 101 may identify the priority between the events. The priority between the events may be designated and pre-stored in the electronic device 101 in which case the electronic device 101 may identify the priority between the events based on the stored priority-related information. The electronic device 101 may provide a user interface for designating the priority between events and, corresponding thereto, identify the priority between the events based on a selection input by the user. In operation 860, the electronic device 101 may control the properties of sound output from at least one of the electronic device corresponding to the first event or the electronic device corresponding to the second event based on the identified priority. For example, when the priority of the first event "turn on the TV," the electronic device 101 may transmit a communication signal 901 for setting the magnitude of sound output from a TV (e.g., the external electronic device 401) to be relatively large and transmit a communication signal 902 to set the magnitude of sound 421 output from the audio component (e.g., the external electronic device 420) to be relatively small. Or, the electronic device 101 may transmit a communication signal for turning off the music playing on the audio component (e.g., the external electronic device 420). When the second event "play music on the audio component" has a high priority, the electronic device 101 may transmit a communication signal 901 for setting the magnitude of sound output from the TV (e.g., the external electronic device 401) to be relatively small and transmit a communication signal 902 for setting the magnitude of sound 421 output from the audio component (e.g., the external electronic device 420) to be relatively large.

Figure 10:
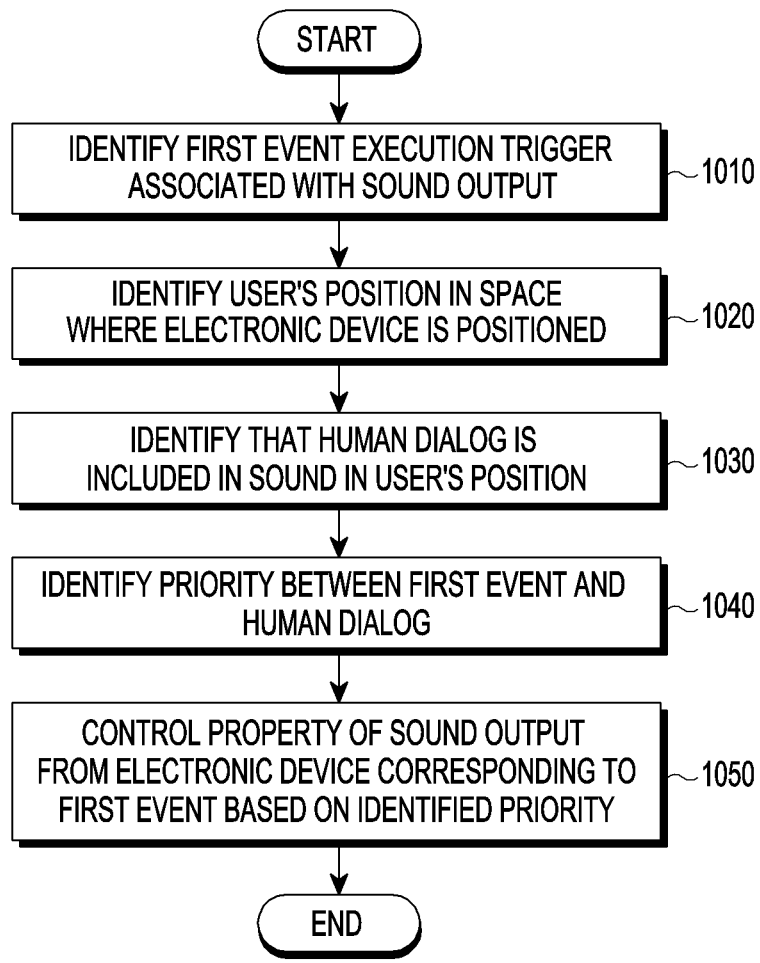
FIG. 10 is a flowchart illustrating a method for operating an electronic device according to various embodiments.
Figure 11:
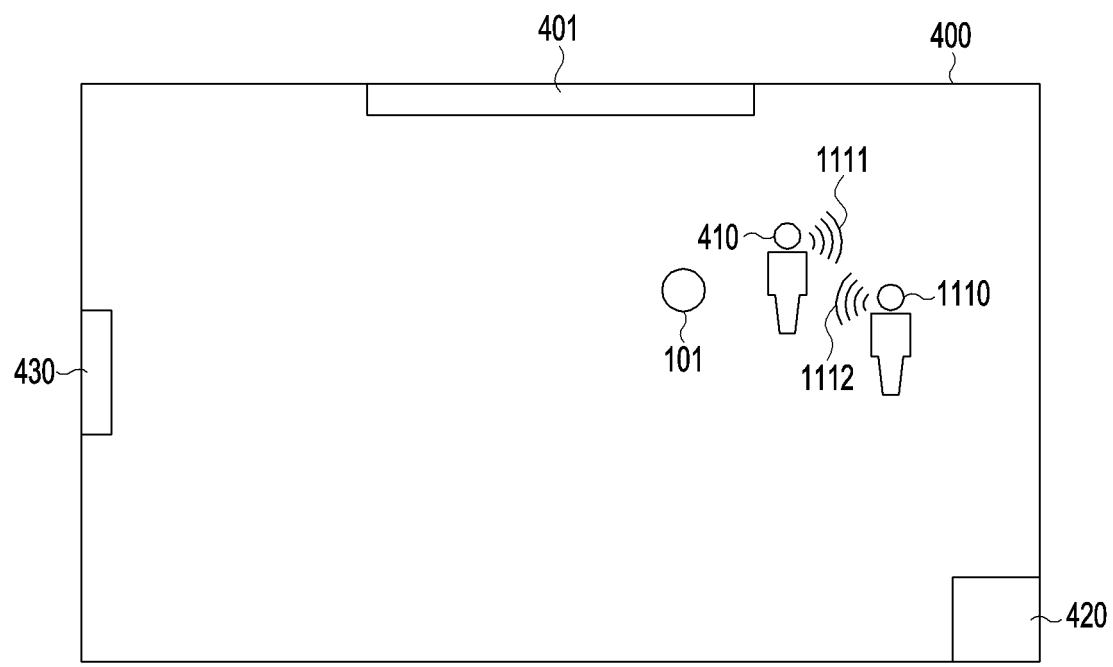
FIG. 11 is a view illustrating operations of an electronic device according to various embodiments.

FIG. 10 is a flowchart illustrating a method for operating an electronic device according to an embodiment. The embodiment shown in FIG. 10 is described in greater detail with reference to FIG. 11. FIG. 11 is a view illustrating operations of an electronic device according to various embodiments.

According to various embodiments, in operation 1010, the electronic device 101 may identify a first event execution trigger associated with sound output. In operation 1020, the electronic device 101 may identify the user's position in the space where the electronic device 101 is positioned. In operation 1030, the electronic device 101 may identify that the sound in the user's position includes a human dialogue. For example, the electronic device 101 may detect voice utterances 1111 and 1112 between a user 410 and another person 1110 as shown in FIG. 11. For example, the electronic device 101 may analyze the sound measured in the user's position 410, identifying that the sound includes the utterances 1111 and 1112 between the plurality of persons. For example, the electronic device 101 may perform voice print analysis on the measured sound and identify that utterances of a plurality of persons are included based on the result of voice print analysis. In operation 1040, the electronic device 101 may identify the priority between the first event and the human dialogue. In operation 1050, the electronic device 101 may control the properties of sound output from the electronic device, corresponding to the first event, based on the identified priority. For example, when the first event "turn on the TV" has a high priority, the electronic device 101 may set the magnitude of sound output from the TV (e.g., the external electronic device 401) to be relatively large. When the human dialogue is high in priority, the electronic device 101 may set the magnitude of sound output from the TV (e.g., the external electronic device 401) to be relatively small.

According to various embodiments, the electronic device 101 may control the properties of sound from the external electronic device based on the result of analysis of the human dialogue. For example, upon identifying that the human dialogue is associated with the content of the external electronic device outputting sound, the electronic device 101 may control the sound output from the external electronic device to be relatively large although the human dialogue is higher in priority.

Figure 12:
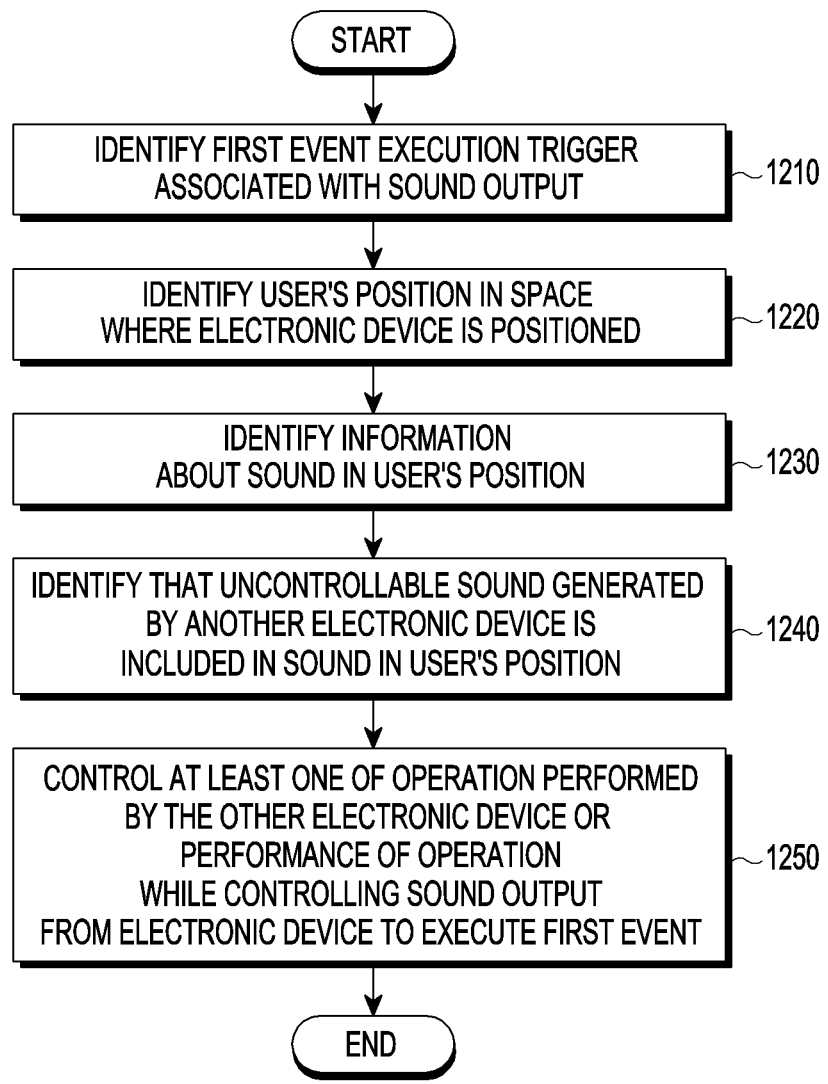
FIG. 12 is a flowchart illustrating a method for operating an electronic device according to various embodiments.
Figure 13:
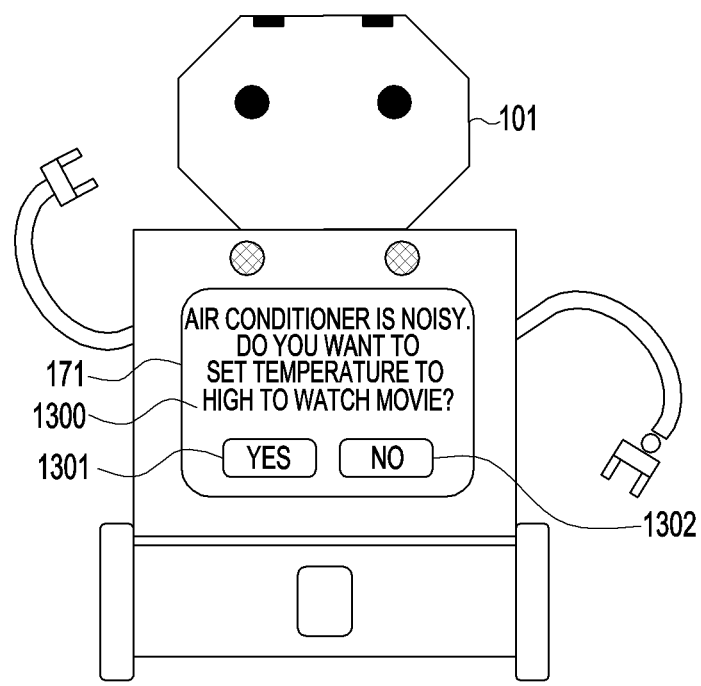
FIG. 13 is a view illustrating operations of an electronic device according to various embodiments.

FIG. 12 is a flowchart illustrating a method for operating an electronic device according to an embodiment of the present invention. The embodiment shown in FIG. 12 is described in greater detail with reference to FIG. 13. FIG. 13 is a view illustrating operations of an electronic device according to various embodiments.

According to various embodiments, in operation 1210, the electronic device 101 may identify a first event execution trigger associated with sound output. In operation 1220, the electronic device 101 may identify the user's position in the space where the electronic device 101 is positioned. In operation 1230, the electronic device 101 may identify information about the sound in the user's position. In operation 1240, the electronic device 101 may identify that the sound in the user's position includes an uncontrollable sound generated by other electronic device. For example, as set forth above, the electronic device 101 may identify that the operation noise 431 from a washer (e.g., the external electronic device 430) is an uncontrollable sound. In operation 1250, the electronic device 101 may control at least one of an operation performed by another electronic device or the performance of an operation while controlling the sound output from the electronic device to execute the first event. For example, the electronic device 101 may control at least one of an operation performed by another electronic device or the performance of an operation based on the priority between the first event and the second event where the properties of sound output are uncontrollable. For example, when the first event "turn on the TV" is high in priority, the electronic device 101 may transmit a communication signal 901 for setting the magnitude of sound output from the TV (e.g., the external electronic device 401) to be relatively large and control the other electronic device to stop a specific operation or reduce the performance of the specific operation. In this case, the electronic device 101 may display a user interface 1300 for identifying the reduction in performance of the other electronic device as shown in FIG. 13. Upon detecting a designation of the confirm performance reduction button 1301, the electronic device 101 may reduce the performance of the other electronic device causing noise. Upon detecting a designation of the reject performance reduction button 1302, the electronic device 101 may maintain the performance of the other electronic device causing noise.

Figure 14:
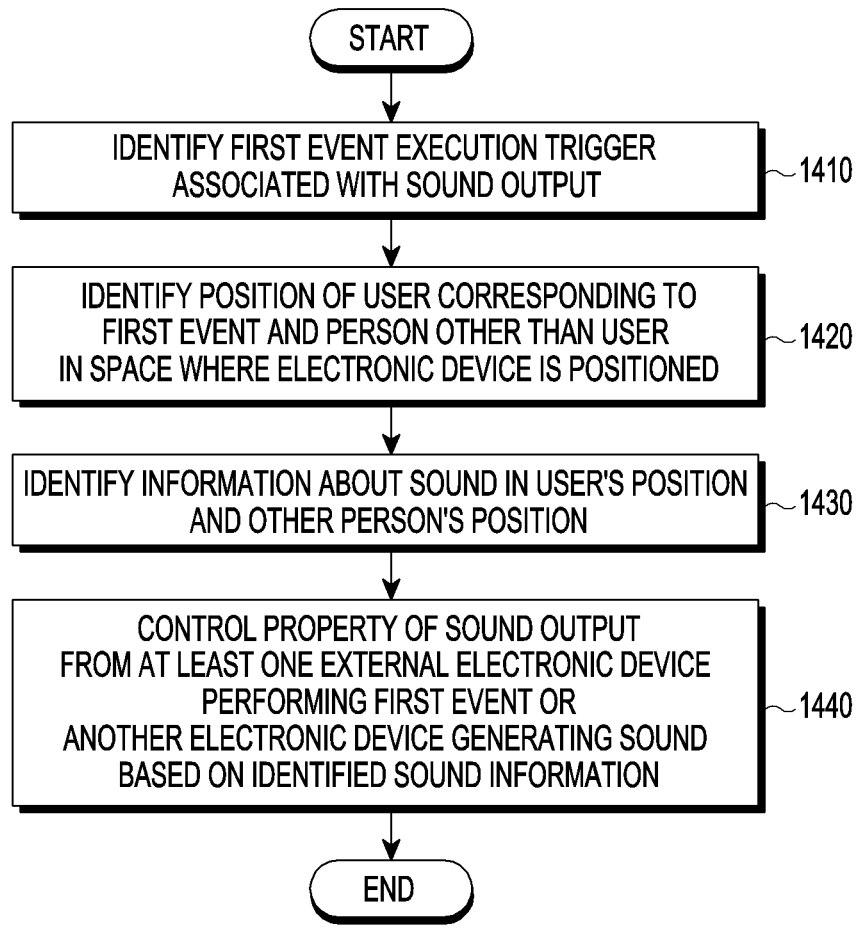
FIG. 14 is a flowchart illustrating a method for operating an electronic device according to various embodiments.
Figure 15:
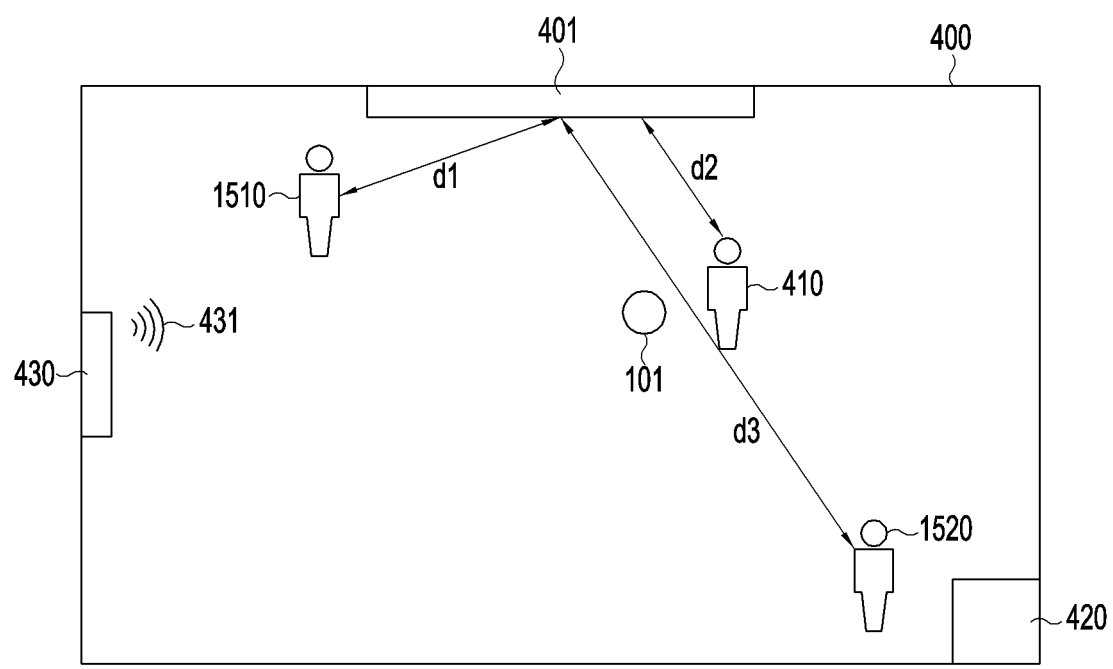
FIG. 15 is a view illustrating operations of an electronic device according to various embodiments.

FIG. 14 is a flowchart illustrating a method for operating an electronic device according to an embodiment of the present invention. The embodiment related to FIG. 14 is described in greater detail with reference to FIG. 15. FIG. 15 is a view illustrating operations of an electronic device according to various embodiments.

According to various embodiments, in operation 1410, the electronic device 101 may identify a first event execution trigger associated with a sound output. In operation 1420, the electronic device 101 may identify the position of the user corresponding to the first event in the space where the electronic device 101 is positioned and the position of a person other than the user. For example, as shown in FIG. 15, the electronic device 101 may identify that the user 410 having requested to output sound and other persons 1510 and 1520 than the user are positioned in the space 400. In operation 1430, the electronic device 101 may identify information about sound in the user's position and the other persons' positions. For example, the electronic device 101 may identify sound information in each of the positions of the user 410 and the other persons 1510 and 1520 on the sound map. Or, the electronic device 101 may sequentially move to each of the positions of the user 410 and the other persons 1510 and 1520 and identify information about the current sound in each post-moving position. In operation 1440, the electronic device 101 may control the properties of sound output from at least one of the external electronic device performing a first event or other electronic device generating sound, based on the identified information about sound. For example, upon obtaining an event trigger to turn on the TV (e.g., the external electronic device 401), the electronic device 101 may identify that the distance d1 between another human 1510 and the TV (e.g., the external electronic device 401) is shorter than the distance d2 between the user 410 and the TV (e.g., the external electronic device 401). The electronic device 101 may set the magnitude of sound output from the external electronic device 401 to be relatively small so that the other person 1510 does not hear the relatively large magnitude of sound. Meanwhile, upon obtaining an event trigger to turn on the TV (e.g., the external electronic device 401), the electronic device 101 may identify that the distance d3 between the other person 1520 and the TV (e.g., the external electronic device 401) is larger than the distance d2 between the user 410 and the TV (e.g., the external electronic device 401). Since the other person 1510 is less likely to hear a relatively large magnitude of sound, the electronic device 101 may set the magnitude of sound output from the external electronic device 401 to be relatively large.

According to various embodiments, the electronic device 101 may identify each of the user 410 and the other persons 1510 and 1520 and, based on the priority corresponding to the result of the identification, control the properties of sound from the external electronic device. For example, when the priority of the user 420 is higher than the priority of the other persons 1510 and 1520, the electronic device 101 may set the magnitude of sound output from the external electronic device 410 to be relatively large. Or, when the priority of the user 420 is lower than the priority of the other persons 1510 and 1520, the electronic device 101 may set the magnitude of sound output from the external electronic device 410 to be relatively small.

Figure 16:
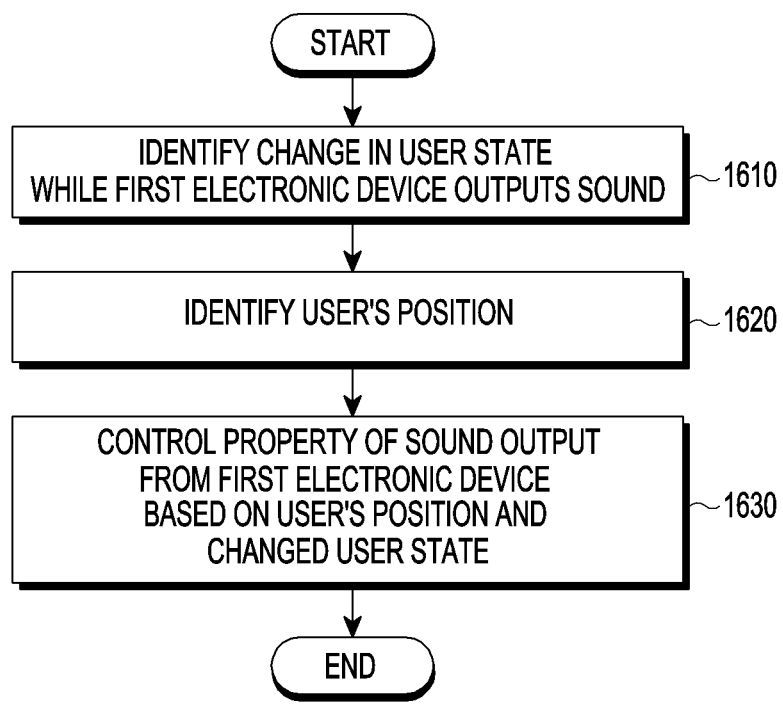
FIG. 16 is a flowchart illustrating a method for operating an electronic device according to various embodiments.

FIG. 16 is a flowchart illustrating a method for operating an electronic device according to an embodiment.

According to various embodiments, in operation 1610, the electronic device 101 may identify a change in user state while a first electronic device outputs sound. For example, the electronic device 101 may identify a change in user state from the user's sitting position to lying position while playing multimedia content. In operation 1620, the electronic device 101 may identify the user's position. In operation 1630, the electronic device 101 may control the properties of sound output from the first electronic device based on the user's position and the change in the user state. For example, upon identifying a change in user state to the lying position, the electronic device 101 may reduce the magnitude of sound output from the first electronic device. Or, upon detecting a change from the user's wake-up state to sleep state, the electronic device 101 may reduce the magnitude of sound output from the first electronic device. Or, the electronic device 101 may identify that the degree of the user's concentration onto the content associated with the sound output increases and, corresponding thereto, the electronic device 101 may increase the magnitude of sound output from the first electronic device. According to various embodiments, the electronic device 101 may adjust the properties of sound output from the first electronic device according to the change in the user's state without considering the user's position.

Figure 17:
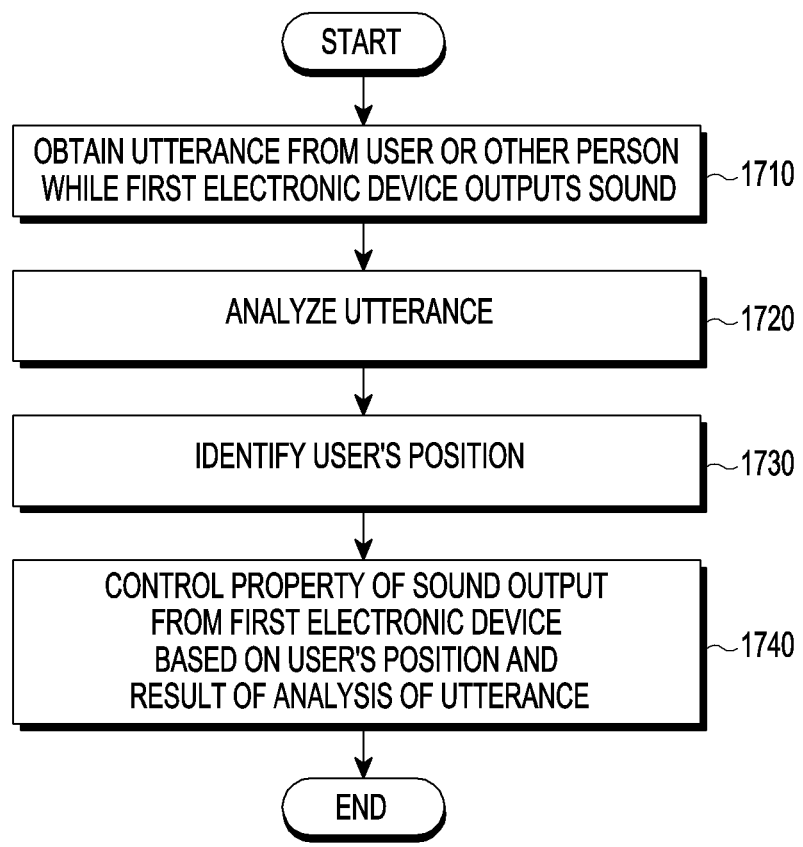
FIG. 17 is a flowchart illustrating a method for operating an electronic device according to various embodiments.

FIG. 17 is a flowchart illustrating a method for operating an electronic device according to an embodiment.

According to various embodiments, in operation 1710, the electronic device 101 may obtain the user's or other person's utterance while the first electronic device outputs sound. In operation 1720, the electronic device 101 may analyze the utterance. In operation 1730, the electronic device 101 may identify the user's position. In operation 1740, the electronic device 101 may control the properties of sound output from the first electronic device based on the user's position and the result of analysis of the utterance. For example, upon detecting utterances among a plurality of persons, i.e., a dialogue, the electronic device 101 may reduce the magnitude of sound output from the first electronic device. Or, upon identifying the content associated with a change in content or termination as a result of analysis of the utterance, the electronic device 101 may control to reduce the magnitude of sound output from the first electronic device or turn off the first electronic device. According to various embodiments, the electronic device 101 may adjust the properties of sound output from the first electronic device based on the result of analysis of the utterance without considering the user's position.

Figure 18A:
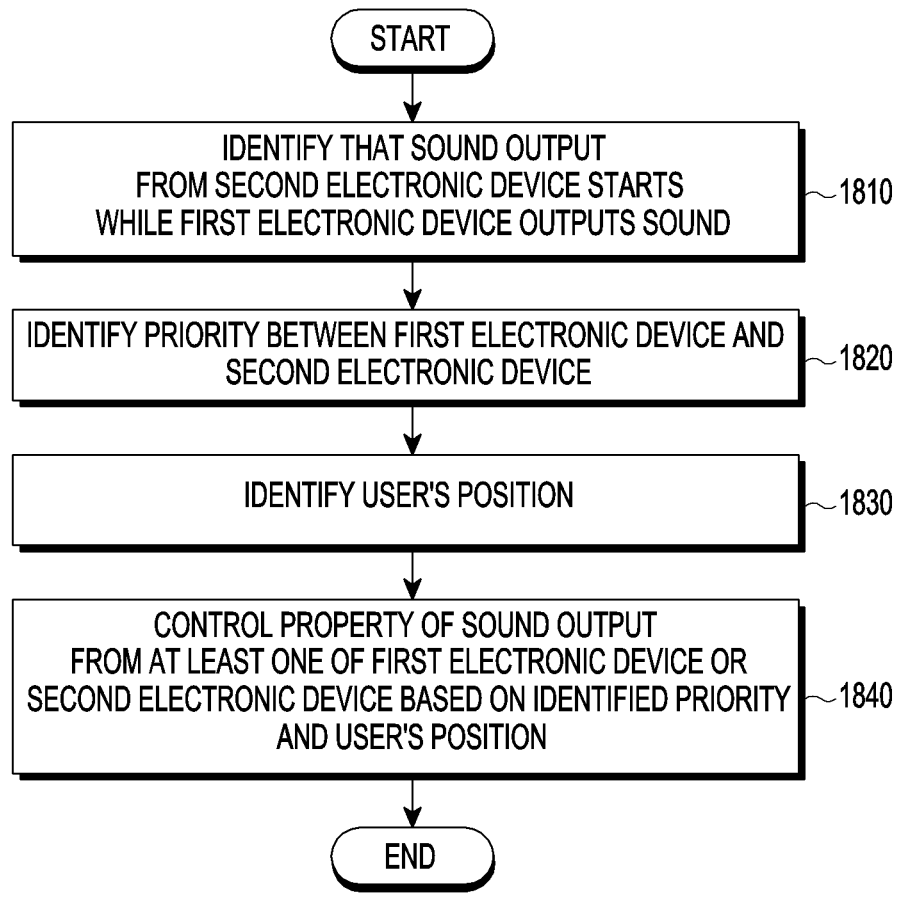
FIG. 18A is a flowchart illustrating a method for operating an electronic device according to various embodiments.

FIG. 18A is a flowchart illustrating a method for operating an electronic device according to an embodiment.

According to various embodiments, in operation 1810, the electronic device 101 may identify that sound output from a second electronic device starts while a first electronic device outputs sound. For example, the electronic device 101 may identify that an alarm indicating an incoming call to a smartphone is output while a TV outputs sound. In operation 1820, the electronic device 101 may identify the priority between the first electronic device and the second electronic device. In operation 1830, the electronic device 101 may identify the user's position. In operation 1840, the electronic device 101 may control the properties of sound output from at least one of the first electronic device or second electronic device based on the user's position and the identified priority. For example, upon identifying that the smartphone is higher in priority, the electronic device 101 may reduce the magnitude of sound output from the TV. According to various embodiments, the priority may be set per event. In this case, the electronic device 101 may be configured to reduce the magnitude of sound output from the TV, in response to an alarm for an incoming call to the smartphone but not, in response to an alarm for receiving a text by the smartphone. According to various embodiments, the electronic device 101 may adjust the properties of sound output from the first electronic device based on the priority between the first electronic device and the second electronic device without considering the user's position.

Figure 18B:
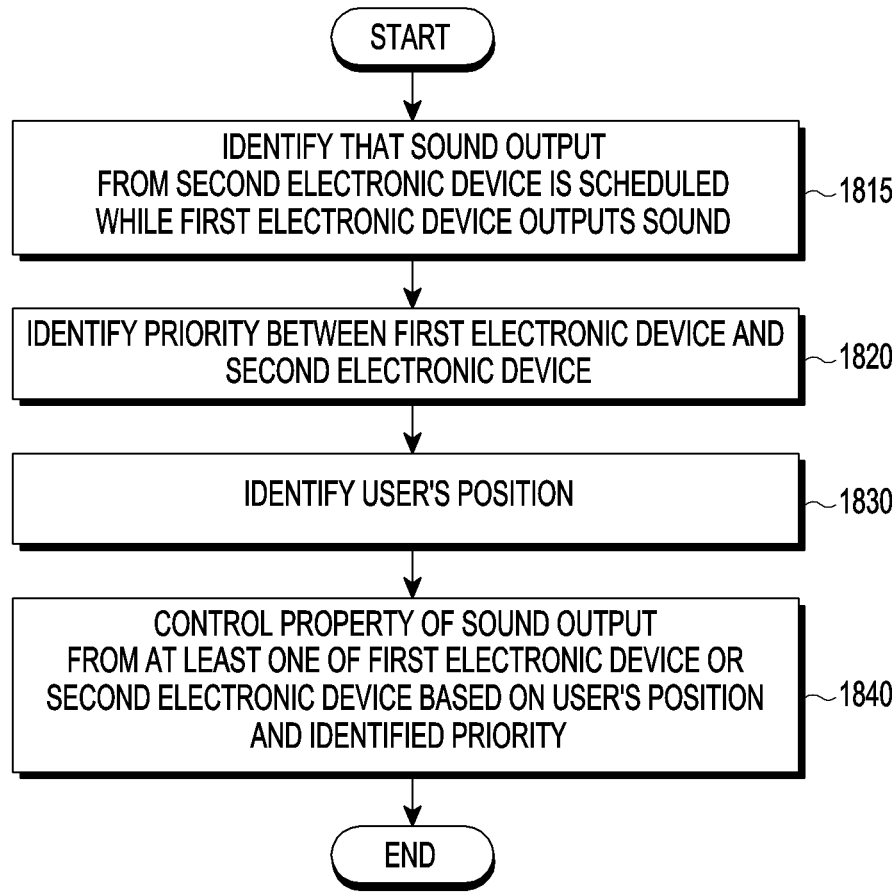
FIG. 18B is a flowchart illustrating a method for operating an electronic device according to various embodiments.

FIG. 18B is a flowchart illustrating a method for operating an electronic device according to various embodiments.

According to various embodiments, in operation 1815, the electronic device 101 may identify that a sound output from the second electronic device is scheduled while the first electronic device outputs sound. For example, the electronic device 101 may identify that an alarm indicating that washing is done in the washer is scheduled while the TV outputs sound. The washer may transmit a communication signal indicating that an alarm indicating washing is done is scheduled to the electronic device 101. In operation 1820, the electronic device 101 may identify the priority between the first electronic device and the second electronic device. In operation 1830, the electronic device 101 may identify the user's position. In operation 1840, the electronic device 101 may control the properties of sound output from at least one of the first electronic device or second electronic device based on the user's position and the identified priority. For example, upon identifying that the washer is higher in priority, the electronic device 101 may reduce the magnitude of sound output from the TV corresponding to the time of output of the alarm from the washer. According to various embodiments, the electronic device 101 may adjust the properties of the sound output from the first electronic device based on the priority between the first electronic device and the second electronic device without considering the user's position.

Various embodiments as set forth herein may be implemented as software (e.g., the program 140) containing commands that are stored in a machine (e.g., computer)-readable storage medium (e.g., an internal memory 136) or an external memory 138. The machine may be a device that may invoke a command stored in the storage medium and may be operated as per the invoked command. The machine may include an electronic device (e.g., the electronic device 101) according to embodiments disclosed herein. When the command is executed by a processor (e.g., the processor 120), the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semipermanently stored in the storage medium and where data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner According to various embodiments, operations performed by modules, programs, or other components may be carried out sequentially, in parallel, repeatedly, or heuristically, or at least some operations may be executed in a different order or omitted, or other operations may be added.

The invention claimed is:

1. An electronic device, comprising:
a memory configured to store instructions; and
a processor configured to execute the stored instructions,
wherein as the instructions are executed, the processor is configured to:
identify a trigger for executing a first event associated with sound generation from an external electronic device,
identify a user's position in a space where the electronic device is positioned,
control the electronic device to move to the user's position at every trigger detection, receive sound in the user's position, and identify information about sound based on the received sound, and
control at least one operation of the external electronic device performing the first event or another external electronic device generating sound, based on the identified sound information.

2. The electronic device of claim 1, wherein as the instructions are executed, the processor is further configured to:
read a sound map including sound information of each of a plurality of points of the space corresponding to a plurality of partitioned cells; and
identify first sound information corresponding to the identified user position of the sound map, as the information about sound at the user's position.

3. The electronic device of claim 2, wherein as the instructions are executed, the processor is further configured to:
measure sound information of at least one point of the space; and
generate the sound map based on the sound information measured at the at least one point.

4. The electronic device of claim 1, wherein as the instructions are executed, the processor is further configured to:
identify at least one of a state or a property of the user; and
control the at least one operation of the external electronic device performing the first event or the other external electronic device generating the sound based on at least one of the user's state or the user's property and the identified sound information.

5. The electronic device of claim 1, wherein as the instructions are executed, the processor is further configured to:
identify at least one of a kind of an identified sound or a kind of a source generating the identified sound; and
control the at least one operation of the external electronic device performing the first event or the other external electronic device generating the sound based on at least one of the identified kind of sound or the identified kind of source generating the sound.

6. The electronic device of claim 1, wherein as the instructions are executed, the processor is further configured to:
analyze an identified sound; and
control the at least one operation of the external electronic device performing the first event or the other external electronic device generating the sound based on a result of the analysis of the identified sound.

7. The electronic device of claim 6, wherein as the instructions are executed, the processor is further configured to:
if a sound from an electronic device capable of controlling output sound is included in the identified sound as a result of the analysis of the identified sound, control a property of the sound output from the electronic device capable of controlling output sound.

8. The electronic device of claim 6, wherein as the instructions are executed, the processor is further configured to:
if a sound from an electronic device incapable of controlling output sound is included in the identified sound as a result of the analysis of the identified sound, control performance of an operation causing noise of the electronic device incapable of controlling output sound.

9. The electronic device of claim 6, wherein as the instructions are executed, the processor is further configured to:
if a human dialogue is included in the identified sound as a result of the analysis of the identified sound, control to reduce a magnitude of sound output from at least one of the external electronic device or the other external electronic device generating the sound.

10. A method for operating an electronic device, the method comprising:
identifying a trigger for executing a first event associated with sound generation from an external electronic device;
identifying a user's position in a space where the electronic device is positioned;

controlling the electronic device to move to the user's position at every trigger detection, receiving sound in the user's position, and identifying information about a sound based on the received sound; and controlling at least one operation of the external electronic device performing the first event or another external electronic device generating sound, based on the identified sound information.

11. The method of claim 10, wherein identifying the information about sound at the user's position includes:

reading a sound map including sound information of each of a plurality of points of the space corresponding to a plurality of cells; and identifying first sound information corresponding to the identified user position of the sound map, as the information about the sound at the user's position.

12. The method of claim 11, further comprising:

measuring sound information of at least one point of the space; and generating the sound map based on the sound information measured at the at least one point.

13. The method of claim 10, wherein controlling the at least one operation of the external electronic device performing the first event or another external electronic device generating sound, based on the identified sound information includes:

identifying at least one of a state or a property of the user; and controlling the at least one operation of the external electronic device performing the first event or the other external electronic device generating the sound based on at least one of the user's state or the user's property and the identified sound information.

* * * * *